United States Patent
Takaishi

(10) Patent No.: US 8,514,512 B2
(45) Date of Patent: Aug. 20, 2013

(54) DISK STORAGE DEVICE, CONTROLLER OF THE SAME, CONTROLLING METHOD PERFORMED BY THE SAME, AND ELECTRONIC DEVICE

(75) Inventor: Kazuhiko Takaishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 48 days.

(21) Appl. No.: 13/245,648

(22) Filed: Sep. 26, 2011

(65) Prior Publication Data

US 2012/0162803 A1 Jun. 28, 2012

(30) Foreign Application Priority Data

Dec. 24, 2010 (JP) ................................. 2010-288845

(51) Int. Cl.
*G11B 5/596* (2006.01)
*G11B 5/09* (2006.01)

(52) U.S. Cl.
USPC .................. 360/77.08; 360/77.04; 360/77.02; 360/78.04; 360/51; 360/29

(58) Field of Classification Search
None
See application file for complete search history.

(56) References Cited

U.S. PATENT DOCUMENTS

| 8,254,218 | B2 * | 8/2012 | Yang et al. | ................. | 369/44.11 |
| 2001/0021077 | A1 * | 9/2001 | Takaishi | ..................... | 360/78.06 |

FOREIGN PATENT DOCUMENTS

| JP | 07-078432 | 3/1995 |
| JP | 2004-039116 | 2/2004 |
| JP | 2005-353148 | 12/2005 |
| JP | 2007-200554 | 8/2007 |
| JP | 2007-234176 | 9/2007 |
| JP | 2008-204625 | 9/2008 |

OTHER PUBLICATIONS

Japanese Office Action dated Apr. 17, 2012, filed in Japanese counterpart Application No. 2010-288845, 7 pages (with English translation).

* cited by examiner

*Primary Examiner* — Andrew L Sniezek
(74) *Attorney, Agent, or Firm* — Patterson & Sheridan LLP

(57) ABSTRACT

According to one embodiment, a disk storage device includes: a disk on which a servo pattern is recorded; a head; a driver; a signal generator; a demodulator; and a controller. Position signals for detecting an offset position from a center of a track are recorded in a recording area of a servo pattern. The signal generator generates a first timing signal indicating a timing for reading the position signals. When the controller performs positional control along a virtual circular orbit of the disk, the signal generator generates a second timing signal. The period of the second timing signal for reading each of the position signals is made shorter than that of the first timing signal. A center time of the period of the second timing signal is shifted closer to a demodulation center time corresponding to a center of the recording area than that of the first timing signal.

19 Claims, 18 Drawing Sheets

Prior Art

Prior Art

Prior Art

PosN/Q: 10.500 [TRACK/SAMPLE] == 0.038 [m/s]

PosErr: 10.500 [TRACK/SAMPLE] == 0.038 [m/s]

DECODE ERROR: 10.500 [TRACK/SAMPLE] == 0.038 [m/s]

Prior Art

| Head | S | C | |
|---|---|---|---|
| 0 | | | ~62 |
| 1 | | | |
| ⋮ | | | |
| n | | | |

PosN/Q: 10.500 [TRACK/SAMPLE] == 0.038 [m/s]

PosErr: 10.500 [TRACK/SAMPLE] == 0.038 [m/s]

DECODE ERROR: 10.500 [TRACK/SAMPLE] == 0.038 [m/s]

PosN/Q: 10.500 [TRACK/SAMPLE] == 0.038 [m/s]

PosErr: 10.500 [TRACK/SAMPLE] == 0.038 [m/s]

DECODE ERROR: 10.500 [TRACK/SAMPLE] == 0.038 [m/s]

DISK STORAGE DEVICE, CONTROLLER OF THE SAME, CONTROLLING METHOD PERFORMED BY THE SAME, AND ELECTRONIC DEVICE

CROSS-REFERENCE TO RELATED APPLICATIONS

This application is based upon and claims the benefit of priority from Japanese Patent Application No. 2010-288845, filed Dec. 24, 2010, the entire contents of which are incorporated herein by reference.

FIELD

Embodiments described herein relate generally to a disk storage device that performs virtual circular control, a controller of the same, a controlling method performed by the same, and an electronic device.

BACKGROUND

Conventionally, some disk storage devices using a head for read and write operations on a disk or the like perform virtual circular control so as to control the position of the head on a circular orbit (virtual circle) that is independent of the eccentricity of the disk. In such virtual circular control, a position orbit (virtual circular orbit) is provided so as to ignore the eccentricity of the disk, and the control of the head is performed based on a value obtained by subtracting a positional fluctuation caused by the eccentricity of the disk from the position (decoded position) of the head demodulated from servo patterns for detecting the offset position with respect to the center of the disk.

In such virtual circular control, because the control is performed such that the eccentricity of the disk is disregarded, a relative velocity occurs between the head and the disk. Therefore, the head traverses the servo patterns diagonally, whereby an error occurs in the decoded position. Accordingly, in such virtual circular control, it is desired to reduce the error in the decoded position.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment of the invention, a disk storage device, comprises: a disk on which a servo pattern is recorded; a head; a driver; a signal generator; a demodulator; and a controller. The servo pattern comprises a recording area for each track. A plurality of position signals for detecting an offset position from a center of the track is recorded in the recording area. The head is configured to read data recorded on the disk which is being rotated. The driver is configured to drive the head in a radial direction of the disk. The signal generator is configured to generate a first timing signal indicating a timing for reading the position signals from the read data. The demodulator is configured to demodulate a position of the head based on the position signals read in accordance with the generated first timing signal. The controller is configured to control the driver by referring to the demodulated position of the head. When the controller performs positional control along a virtual circular orbit of the disk, the signal generator is configured to generate a second timing signal. A period of the second timing signal for reading each of the position signals is made shorter than that of the first timing signal. The center time of the period of the second timing signal is shifted closer to a demodulation center time corresponding to a center of the recording area than that of the first timing signal.

A disk storage device, a controller of the same, a controlling method performed by the same, and an electronic device according to an embodiment are described below in greater detail with reference to the accompanying drawings. To explain the embodiment, a disk storage device using a magnetic head for read and write operations on a magnetic disk is used as an example. It goes without saying that the disk storage device may be an optical disk device using a digital versatile disc (DVD), a magneto-optic (MO) disc or the like, or a read-only device (reproducing device).

Figure 1:
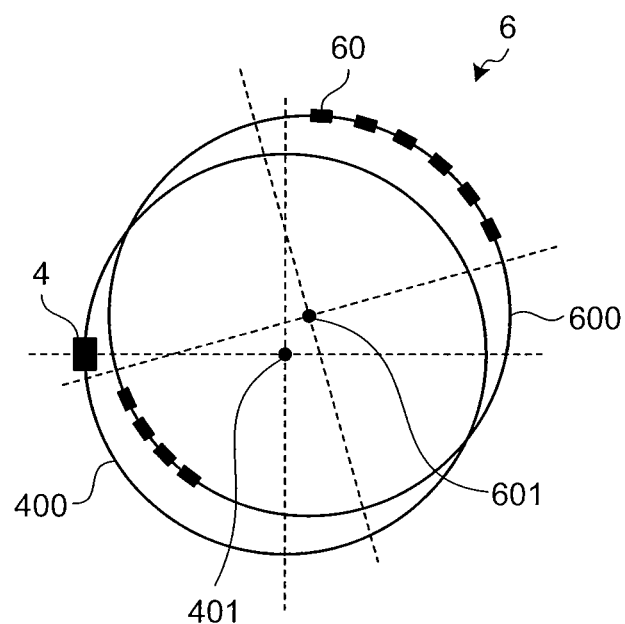
FIG. 1 is an exemplary diagram for explaining virtual circular control according to an embodiment.

Virtual circular control will now be described. FIG. 1 is an exemplary diagram for explaining the virtual circular control.

As illustrated in FIG. 1, it is extremely difficult to align an axis center 401 of a spindle motor that drives to rotate a disk 6 with a rotation center 601 of the disk 6 exactly in a disk storage device. A tiny misalignment (eccentricity) occurs between the axis center 401 and the rotation center 601.

If a magnetic head 4 is caused to follow the eccentricity, the magnetic head 4 oscillates constantly (a driving current flows therethrough), resulting in an increase in power consumption. If the magnetic head 4 is provided in plurality, the operation during switching the heads is likely to be unstable. To address these problems, a method for controlling an actuator not by causing a magnetic head to follow the eccentricity but by causing the magnetic head not to follow the eccentricity has been proposed. For example, Japanese Patent Application Publication (KOKAI) No. H9-128915 (published on May 16, 1997) discloses this type of method. If the magnetic head 4 is caused not to follow the eccentricity, a trajectory 400 of the magnetic head 4 matches with a perfect circle (virtual circle) centering on the axis center 401 of the spindle motor, thereby preventing the magnetic head 4 from oscillating.

Figure 2:
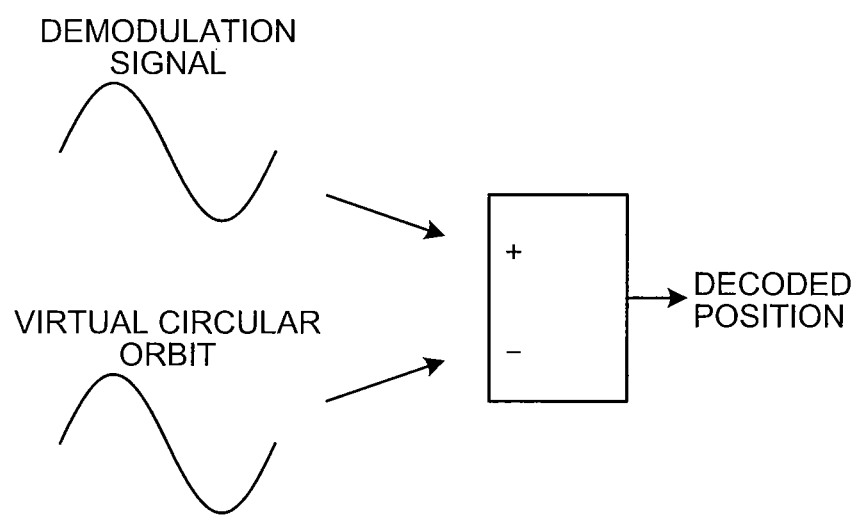
FIG. 2 is an exemplary diagram for explaining a decoded position in the virtual circular control in the embodiment.

This proposal, as illustrated in FIG. 2, discloses the method for controlling an actuator by supplying a position orbit (virtual circular orbit) independently of the eccentricity, eliminating the position orbit from a demodulation signal of the head, and obtaining a decoded position. In this manner, as illustrated in FIG. 1, the magnetic head 4 is positioned on the trajectory 400 (circular orbit) centering on the axis center 401 of the spindle motor by using position signals, with respect to a circular orbit 600 of a servo pattern 60 recorded on the circumference of the disk 6. In this case, the magnetic head 4 traverses the servo pattern 60 obliquely (see arrows illustrated in FIGS. 3 and 4).

Figure 3:
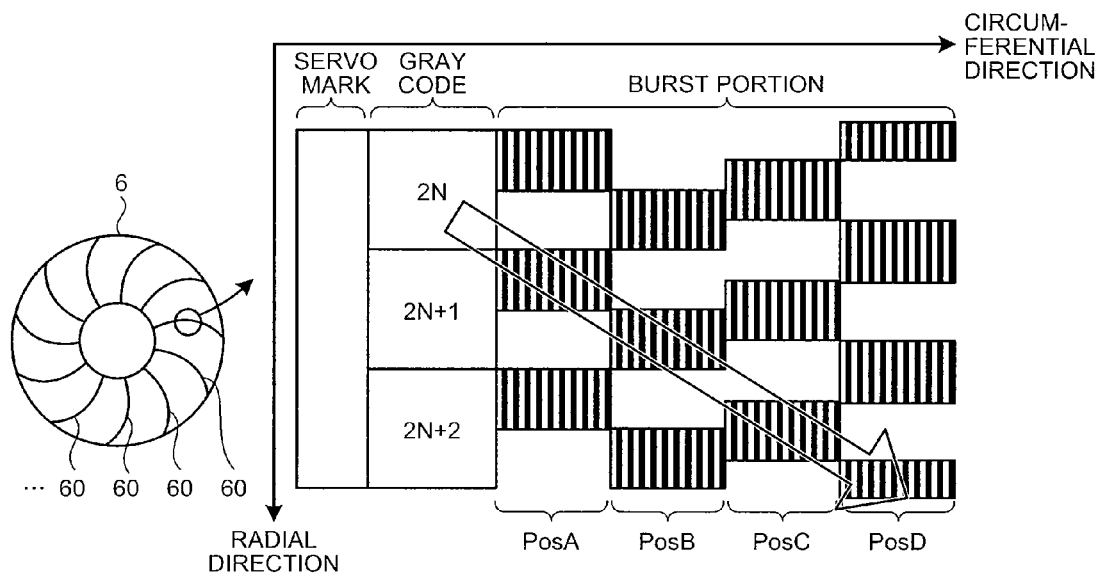
FIG. 3 is an exemplary conceptual diagram of a servo pattern recorded on a disk in the embodiment.

The disk 6 will now be described in detail. FIG. 3 is an exemplary conceptual diagram of an example of the servo pattern 60 recorded on the disk 6. As illustrated in FIG. 3, the servo pattern 60 extending in arc in the radial direction from the center of rotation is recorded on the disk 6 on which the disk storage device performs read and write operations. The servo pattern 60 is information used for positioning the magnetic head.

The disk 6 is a storage medium obtained by forming a magnetic film on a disk-shaped substrate made of metal or glass. When data is recorded on the disk 6, the magnetic head applies a magnetic field on a recording area in which the data is to be recorded on the disk 6 to change the magnetization of the magnetic material on the surface, thereby recording the data. When data is read and reproduced from the disk 6, the magnetic head is moved to the recording area from which the data is to be reproduced on the disk 6 to read the magnetization of the magnetic material on the disk 6, thereby reproducing the data. The recording method of the disk 6 may be the perpendicular magnetic recording or the longitudinal magnetic recording.

The servo pattern 60 is configured to comprise a servo mark, a Gray code, and a burst portion. The servo mark is a reference mark that indicates the beginning of the servo pattern 60 and serves as a reference for reading. The Gray code records therein a track number for each track ("2N", "2N+1", "2N+2" . . . ) as digital data. In the disk storage device, the track number recorded in the Gray code is demodulated, making it possible to detect what track number the magnetic head is positioned. The burst portion is a recording area in which position signals PosA, PosB, PosC, and PosD indicating an area pattern of four phases shifted by 90 degrees are recorded so as to detect an offset position with respect to the center of the track in each track. In the disk storage device, the amplitude (corresponding to the area) of the position signals PosA, PosB, PosC, and PosD recorded in the burst portion is obtained to demodulate the position (offset position) of the magnetic head with respect to the center of the track of the track number thus detected.

Figure 4:
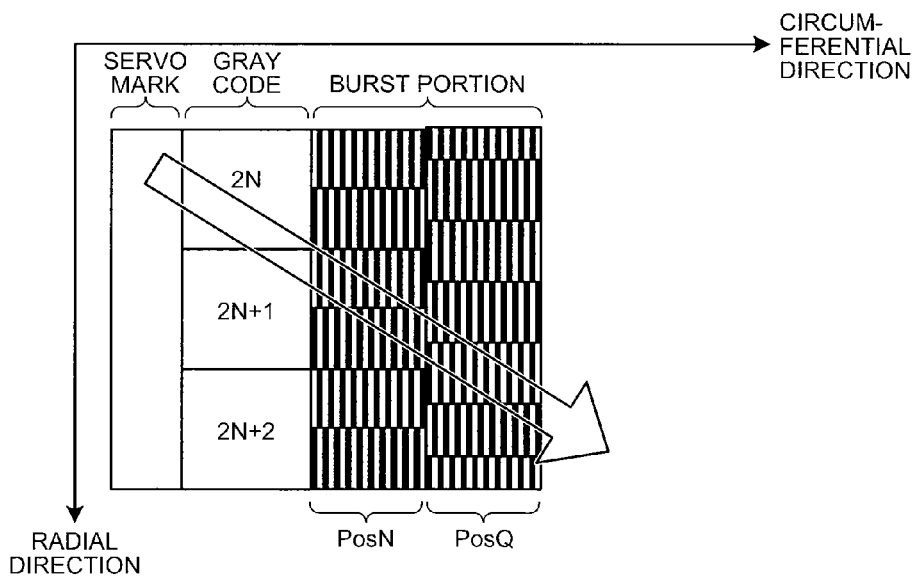
FIG. 4 is another exemplary conceptual diagram of a servo pattern recorded on the disk in the embodiment.

FIG. 4 is another exemplary conceptual diagram of an example of the servo pattern 60 recorded on the disk 6. More specifically, FIG. 4 is an exemplary diagram illustrating the case where a NULL pattern of two phases is formed in the burst portion of the servo pattern 60. As illustrated in FIG. 4, in the case of the NULL pattern, position signals PosN and PosQ of two phases shifted with respect to each other by 180 degrees are recorded in the burst portion. While the NULL pattern is similar to the pattern illustrated in FIG. 3, the width of the burst portion thereof can be made half of that of the pattern illustrated in FIG. 3. In the disk storage device, the amplitude (corresponding to the area) of the position signals PosN and PosQ recorded in the burst portion and change in the phases are obtained to demodulate the position (offset position) of the magnetic head with respect to the center of the track of the track number thus detected. It goes without saying that a DC pattern having a shape similar to that of the NULL pattern is processed in the same manner, which is not particularly illustrated.

Demodulation of the position of the magnetic head with the position signals PosA, PosB, PosC, and PosD will now be described. First, the position signals PosA, PosB, PosC, and PosD are obtained to calculate PosN and PosQ by Equations (1) and (2), respectively. In the case of the NULL pattern, because the position signals PosN and PosQ correspond to the results of Equations (1) and (2), the calculation can be omitted.

$$PosN = PosA - PosB \quad (1)$$

$$PosQ = PosC - PosD \quad (2)$$

A linear portion of the position signals is used to obtain a decoded position (current position of the magnetic head). The decoded position is obtained by calculation. For example, the decoded position (Position) is calculated by Equation blow (e.g., Japanese Patent Application (KOKAI) No. H8-195044 (KOKAI)). In other words, an absolute value abs (PosN) of PosN is compared with an absolute value abs (PosQ) of PosQ, and if abs (PosN)≦abs (PosQ) is satisfied, the decoded position is obtained by Equation (3).

$$Position = -sgn(PosQ) * PosN + Track \quad (3)$$

If sgn(PosQ)*even(Track)>0.0 is satisfied, Equation (4) is added to Equation (3).

$$Position += sgn(PosQ) * sgn(PosN) * 1.0 \quad (4)$$

On the contrary, if abs(PosN)≦abs(PosQ) is not satisfied, Equation (5) is used.

$$Position = sgn(PosN) * (PosQ + even(Track) * 0.5) + Track \quad (5)$$

sgn( ) represents the sign of ( ), Track represents the track number, and "1" is assigned to even(Track) when the track number is an even number, whereas "0" is assigned thereto when the track number is an odd number. If this is written in C program, it is described as follows:

```
if(abs(PosN)≦abs(PosQ)){
  Position=-sgn(PosQ)*PosN+Track;
  if(sgn(PosQ)*even(Track)>0.0)
  Position+=sgn(PosQ)*sgn(PosN)*1.0;
}else{
```

Position=sgn(PosN)*(PosQ+even(Track)*0.5)+Track;

To examine the relationship between a real position and a decoded position of the magnetic head, simulation is performed by using a conventional disk storage device as a model. The simulation is performed in a case of an area pattern, for example, in which the position signals PosA, PosB, PosC, and PosD of four phases are obtained from the burst portion to obtain the decoded position.

Figure 5A:
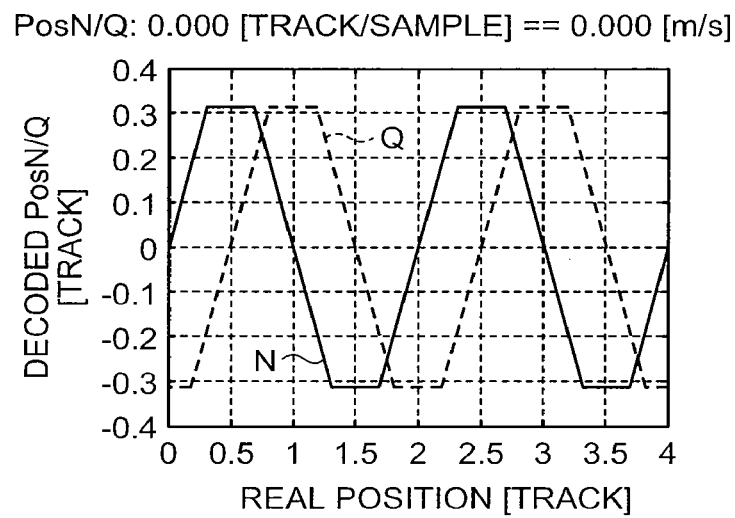
FIG. 5A is an exemplary graph of PosN and PosQ with respect to a real position of a magnetic head in a simulation result of a conventional disk storage device.
Figure 5B:
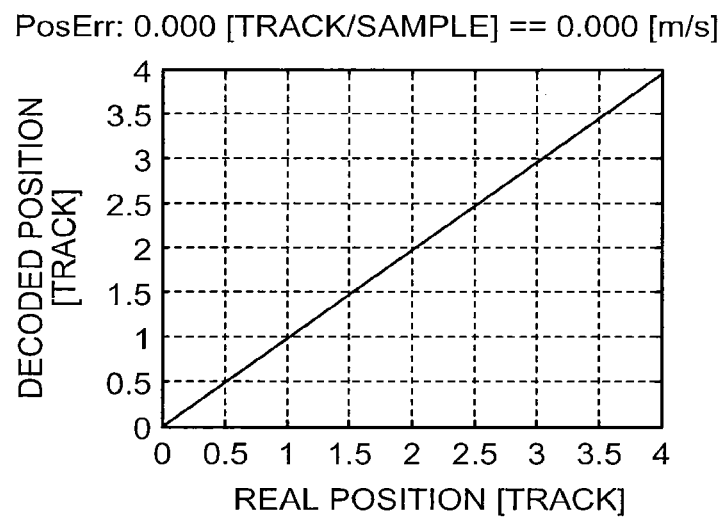
FIG. 5B is an exemplary graph of the real position and a decoded position of the magnetic head in the simulation result of the conventional disk storage device.
Figure 6A:
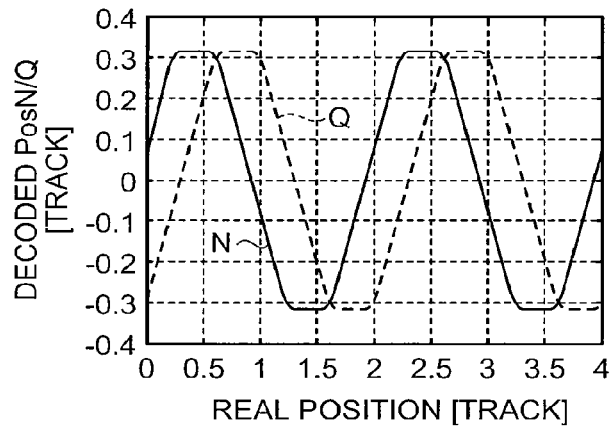
FIG. 6A is another exemplary graph of PosN and PosQ with respect to a real position of the magnetic head in a simulation result of the conventional disk storage device.
Figure 6B:
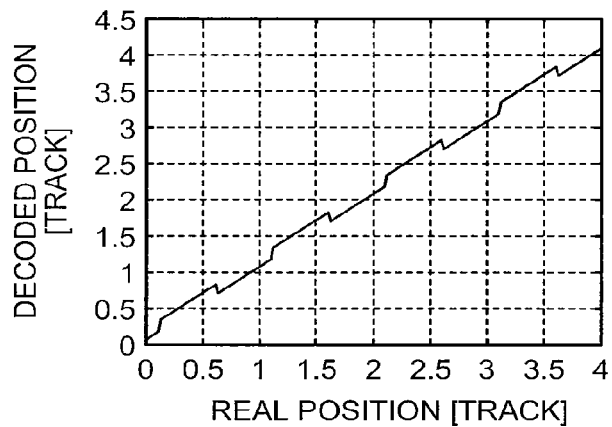
FIG. 6B is another exemplary graph of the real position and a decoded position of the magnetic head in the simulation result of the conventional disk storage device.
Figure 6C:
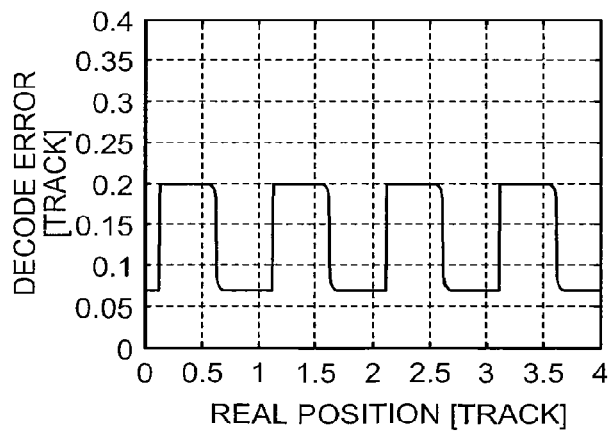
FIG. 6C is an exemplary graph illustrating a position error caused by a relative velocity in the simulation result of the conventional disk storage device.

FIGS. 5A and 6A are exemplary graphs of PosN and PosQ with respect to a real position of the magnetic head in a simulation result of the conventional disk storage device. FIGS. 5B and 6B are exemplary graphs of the real position and a decoded position of the magnetic head in the simulation result of the conventional disk storage device. FIG. 6C is an exemplary graph of a position error caused by a relative velocity in the simulation result of the conventional disk storage device.

FIG. 5A and FIG. 5B illustrate the simulation result in the case where the velocity of the magnetic head in the radial direction is 0 track/sample. As illustrated in FIG. 5A, if the velocity of the magnetic head in the radial direction is 0 track/sample, the phase relationship between PosN and PosQ is a relationship in which they are shifted from each other by 0.5 track, and this coincide with the record in the burst portion. Therefore, as illustrated in FIG. 5B, no error occurs between the real position and the decoded position of the magnetic head.

FIGS. 6A, 6B, and 6C illustrate the simulation result in the case where virtual circular control is performed by rotating a disk having an eccentricity of 50 μm at 7200 rpm. In the simulation, the maximum relative velocity between the magnetic head and the disk is 10.5 tracks/sample.

When the virtual circular control is performed under the conditions described above, as illustrated in FIG. 6A, the phase relationship between PosN and PosQ is changed from the state illustrated in FIG. 5A. More specifically, PosN is shifted to the right in FIG. 6A (direction of an increase in the tracks), whereas PosQ is shifted to the left in FIG. 6A (direction of a decrease in the tracks). Therefore, as illustrated in FIG. 6B, errors occur between the real position and the decoded position of the magnetic head. The errors, as illustrated in FIG. 6C, correspond to 0.13 track (difference between the peaks and the troughs in the waveform).

Figure 7A:
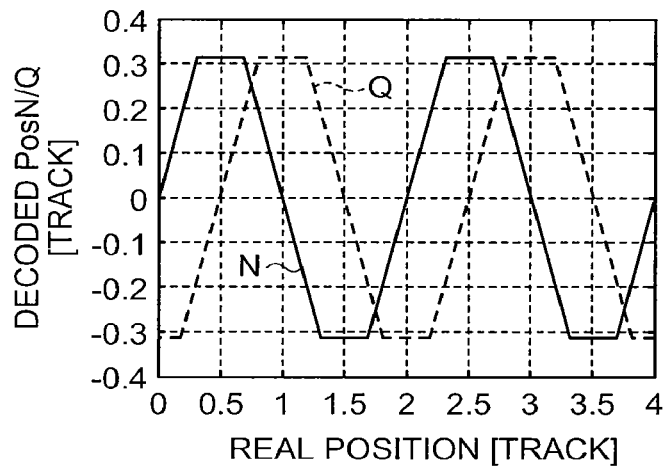
FIG. 7A is an exemplary graph of PosN and PosQ with respect to a real position of the magnetic head in a simulation result of the conventional disk storage device.
Figure 7B:
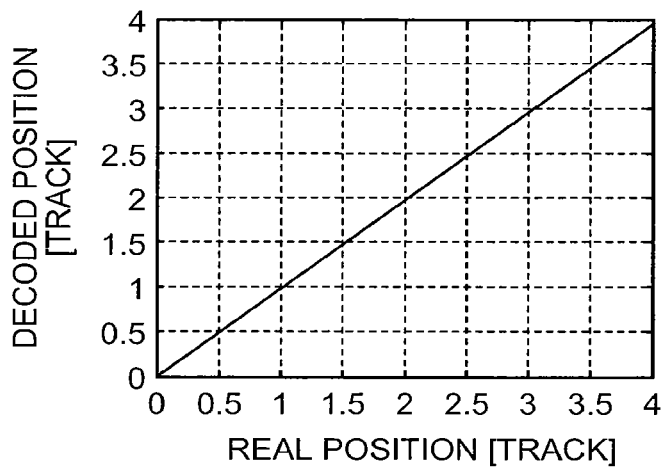
FIG. 7B is an exemplary graph of the real position and a decoded position of the magnetic head in the simulation result of the conventional disk storage device.
Figure 8A:
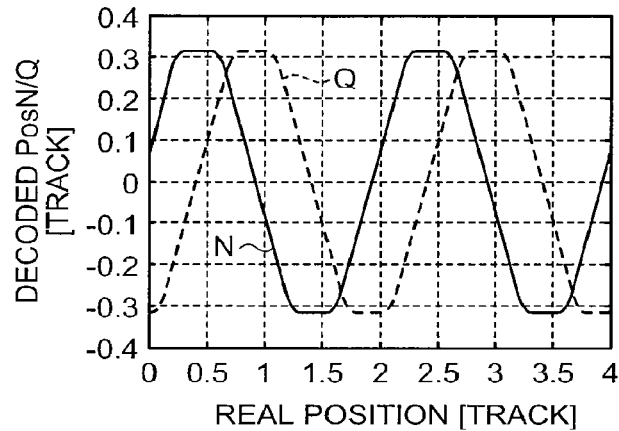
FIG. 8A is another exemplary graph of PosN and PosQ with respect to a real position of the magnetic head in a simulation result of the conventional disk storage device.
Figure 8B:
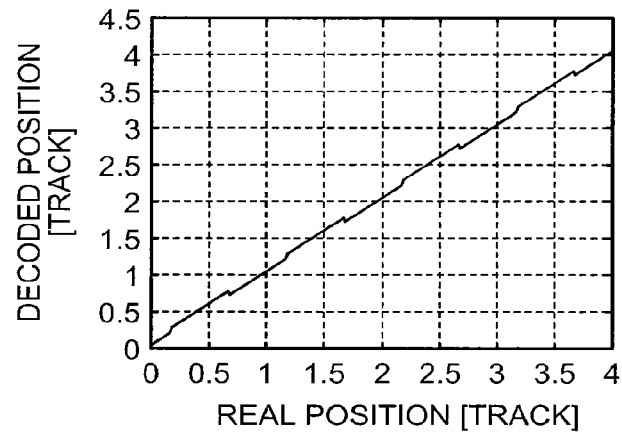
FIG. 8B is another exemplary graph of the real position and a decoded position of the magnetic head in the simulation result of the conventional disk storage device.
Figure 8C:
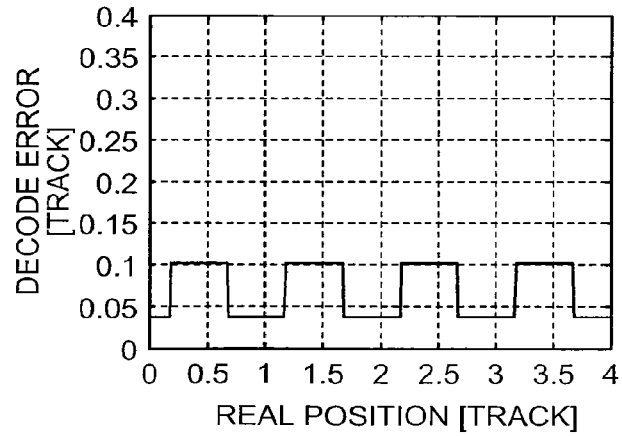
FIG. 8C is an exemplary graph illustrating a position error caused by a relative velocity in the simulation result of the conventional disk storage device.

Similarly, a simulation result of the conventional disk storage device is illustrated in a case of the NULL pattern, for example, in which the position signals PosN and PosQ of two phases are obtained from the burst portion to obtain the decoded position. FIGS. 7A and 8A are exemplary graphs of PosN and PosQ with respect to a real position of the magnetic head in the simulation result of the conventional disk storage device. FIGS. 7B and 8B are exemplary graphs of the real position and a decoded position of the magnetic head in the simulation result of the conventional disk storage device. FIG. 8C is an exemplary graph illustrating a position error caused by a relative velocity in the simulation result of the conventional disk storage device.

FIG. 7A and FIG. 7B illustrate the simulation result in the case where the velocity of the magnetic head in the radial direction is 0 track/sample. As illustrated in FIG. 7A, similarly in the case of the NULL pattern, if the velocity of the magnetic head in the radial direction is 0 track/sample, the phase relationship between PosN and PosQ is a relationship in which they are shifted from each other by 0.5 track, thus it coincides with the record in the burst portion. Therefore, as illustrated in FIG. 7B, no error occurs between the real position and the decoded position of the magnetic head.

FIGS. 8A, 8B, and 8C illustrate the simulation result in the case where the virtual circular control is performed by rotating a disk having an eccentricity of 50 μm at 7200 rpm. In the simulation, the maximum relative velocity between the magnetic head and the disk is 10.5 tracks/sample.

Similarly in the case of the NULL pattern, when the virtual circular control is performed under the conditions described above, as illustrated in FIG. 8A, the phase relationship between PosN and PosQ is shifted from the state illustrated in FIG. 7A. More specifically, PosN is shifted to the right in FIG. 8A (direction of an increase in the tracks), whereas PosQ is shifted to the left in FIG. 8A (direction of a decrease in the tracks). Therefore, as illustrated in FIG. 8B, errors occur between the real position and the decoded position of the magnetic head. The errors, as illustrated in FIG. 8C, correspond to 0.06 track (difference between the peaks and the troughs in the waveform). In this manner, when the virtual circular control is performed, errors occur in the decoded position.

Figure 9:
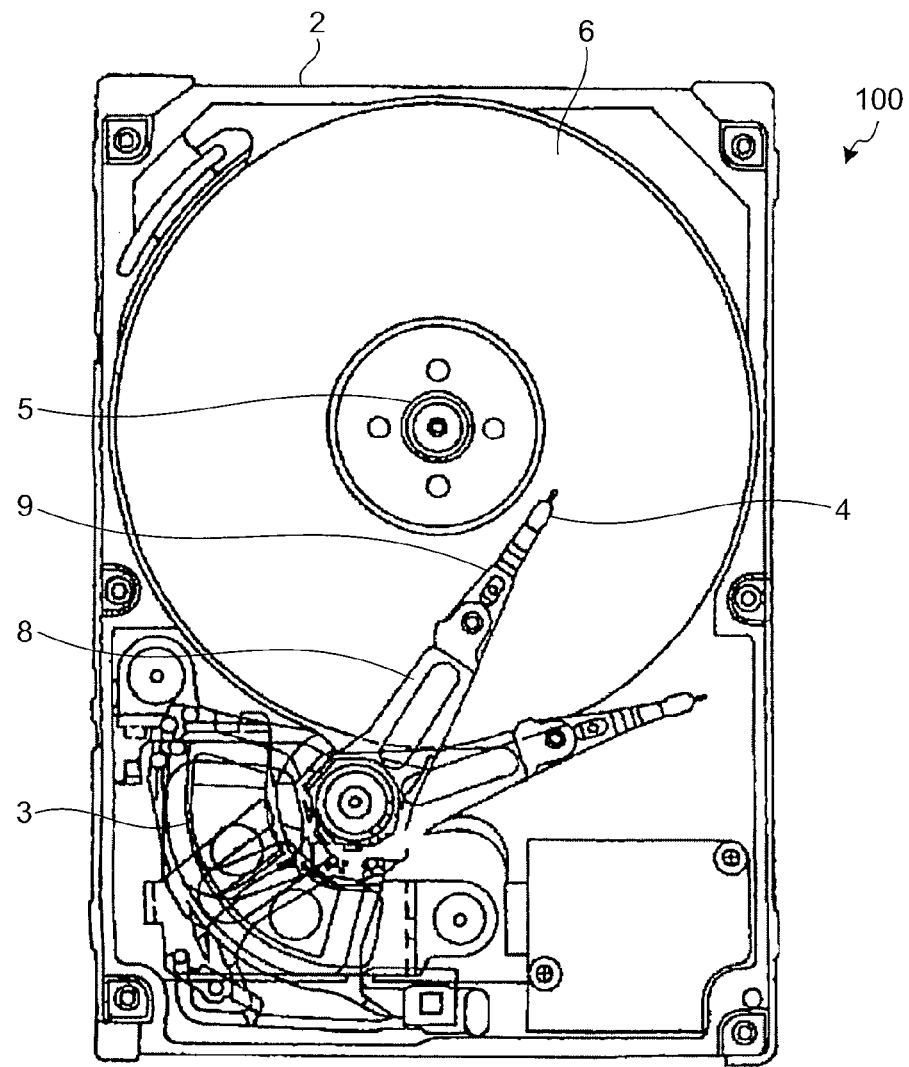
FIG. 9 is an exemplary top view of a disk storage device in the embodiment.
Figure 10:
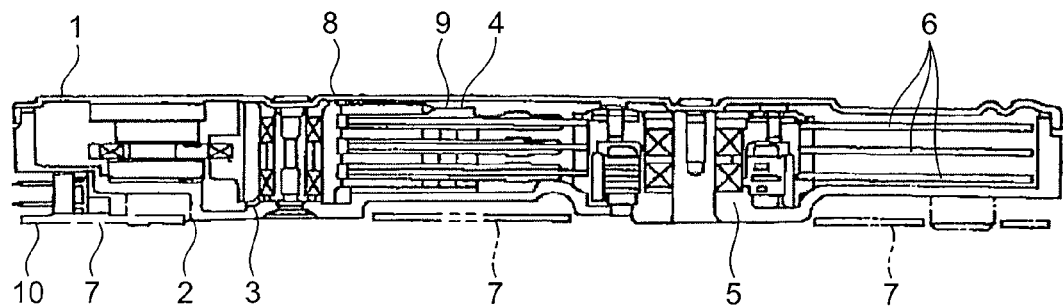
FIG. 10 is an exemplary cross-sectional view of the disk storage device in the embodiment.

The disk storage device according to the embodiment will now be described. FIG. 9 is an exemplary top view of a disk storage device 100 according to the embodiment. FIG. 10 is an exemplary cross-sectional view of the disk storage device 100 according to the embodiment. In the embodiment, a hard disk drive is used as an example of the disk storage device 100.

As illustrated in FIG. 9 and FIG. 10, the disk 6 is configured by forming a magnetic recording layer on a substrate (disk). The disk 6 is 2.5 inches in size, for example, and three disks 6 are provided in the drive. A spindle motor (SPM) 5 supports and rotates the disk 6. The magnetic head 4 is provided to an actuator. The magnetic head 4 is provided in plurality so as to correspond to the top surfaces and the rear surfaces of the three disks 6, respectively. The actuator comprises a voice coil motor (VCM) 3, an arm 8, and a flexure 9 (suspension). Each magnetic head 4 is attached to an end of the flexure 9.

The magnetic head 4 reads and writes data from and to the disk 6. The magnetic head 4 comprises a magnetoresistive (MR) element (reproduction element) and a write element. The VCM 3 drives the magnetic head 4 in the radial direction of the disk 6 to position the magnetic head 4 on a desired track of the disk 6. The VCM 3 and the SPM 5 are arranged on a drive base 2. A cover 1 covers the drive base 2 to separate the interior of the drive from the exterior. A printed circuit board 7 is arranged under the drive base 2 and has a control circuit of the drive mounted thereon. A connector 10 is also arranged under the drive base 2 to connect the control circuit and the exterior. The drive is small in size, and used as an internal disk for a notebook personal computer, for example.

Figure 11:
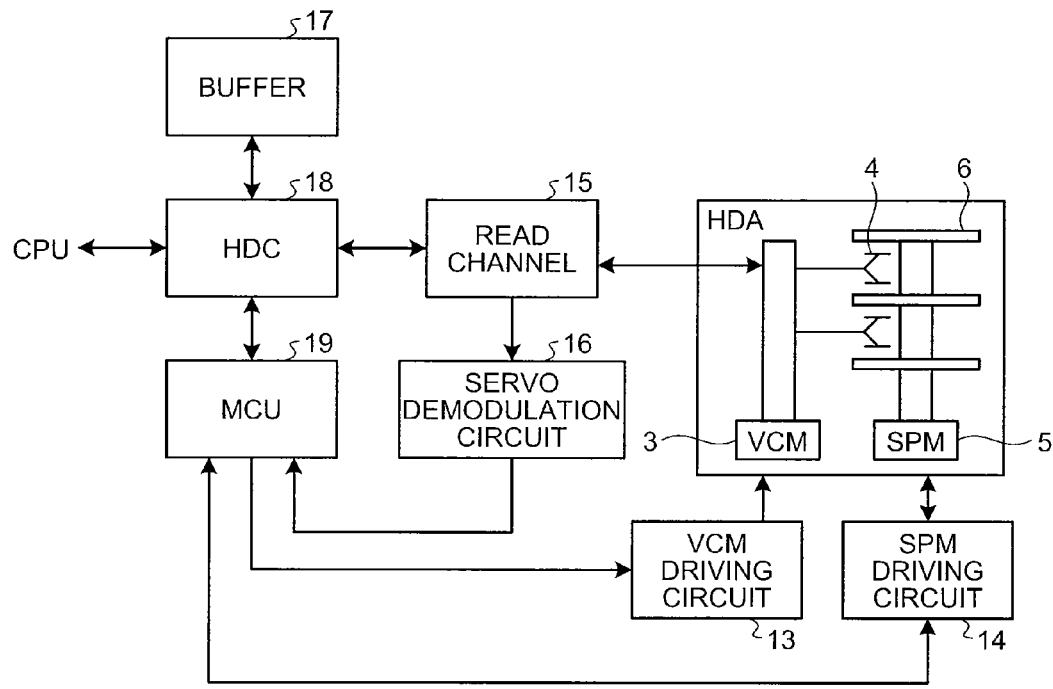
FIG. 11 is an exemplary block diagram of the disk storage device in the embodiment.

FIG. 11 is an exemplary block diagram illustrating the configuration of the disk storage device 100 according to the embodiment. A hard disk controller (HDC) 18 performs interface control for a host central processing unit (CPU) such as transfer of various types of commands and transfer of data therebetween, and generates a control signal for controlling a recording and reproducing format on the magnetic disk medium inside the magnetic disk device. A buffer 17 is used for storing therein write data supplied from the host CPU temporarily, and read data read from the magnetic disk medium temporarily.

A micro controller unit (MCU) 19 comprises a micro processing unit (MPU), a memory, a digital-to-analog (DA) converter, and an analog-to-digital (AD) converter. The MCU 19 performs servo control (positioning control) to position the magnetic head 4, for example. The MCU 19 executes a computer program stored in the memory to recognize a position signal supplied from a servo demodulation circuit 16, thereby calculating a control value of a VCM control current for the VCM 3 for positioning the magnetic head 4. Furthermore, the MCU 19 controls a driving current for an SPM driving circuit 14.

A VCM driving circuit 13 is formed of a power amplifier for applying a driving current to the VCM 3. The SPM driving circuit 14 is formed of a power amplifier for applying a driving current to the SPM 5 that rotates the disk 6.

Figure 13:
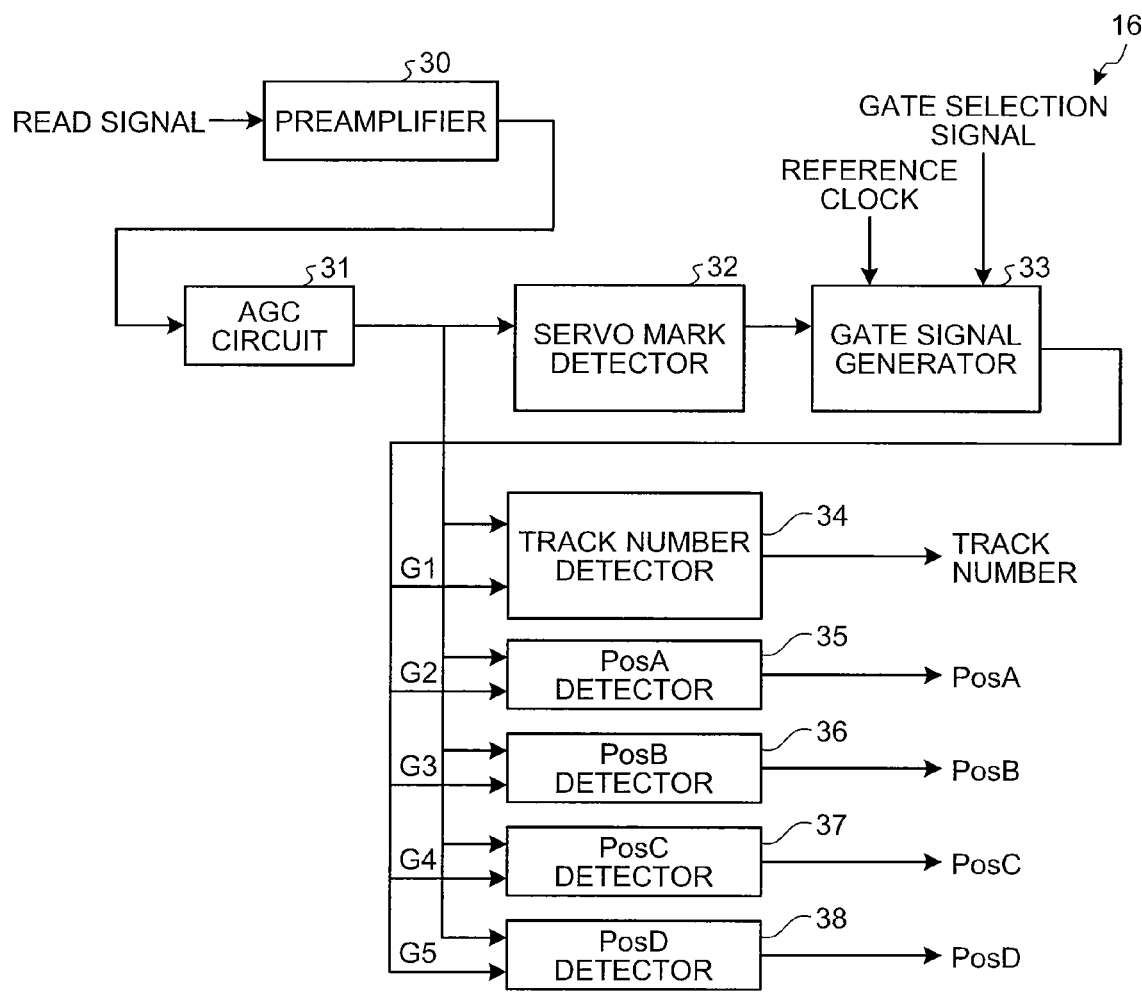
FIG. 13 is an exemplary block diagram of a servo demodulation circuit in the embodiment.

A read channel 15 is a circuit that performs recording and reproducing. The read channel 15 comprises a modulation circuit for recording write data supplied from the host CPU on the disk 6, a parallel-serial conversion circuit, a demodulation circuit for reproducing data from the disk 6, and a serial-parallel conversion circuit. The servo demodulation circuit 16, which will be described later with reference to FIG. 13, is a circuit that demodulates the servo pattern 60 recorded on the disk 6, and outputs a position signal thus demodulated to the MCU 19.

A head integrated circuit (IC), which is not illustrated, having a built-in write amplifier that supplies a recording current to the magnetic head 4 and a built-in preamplifier that amplifies reproducing voltage supplied from the magnetic head 4 is provided in the drive head/disk assembly (HDA).

Figure 12:
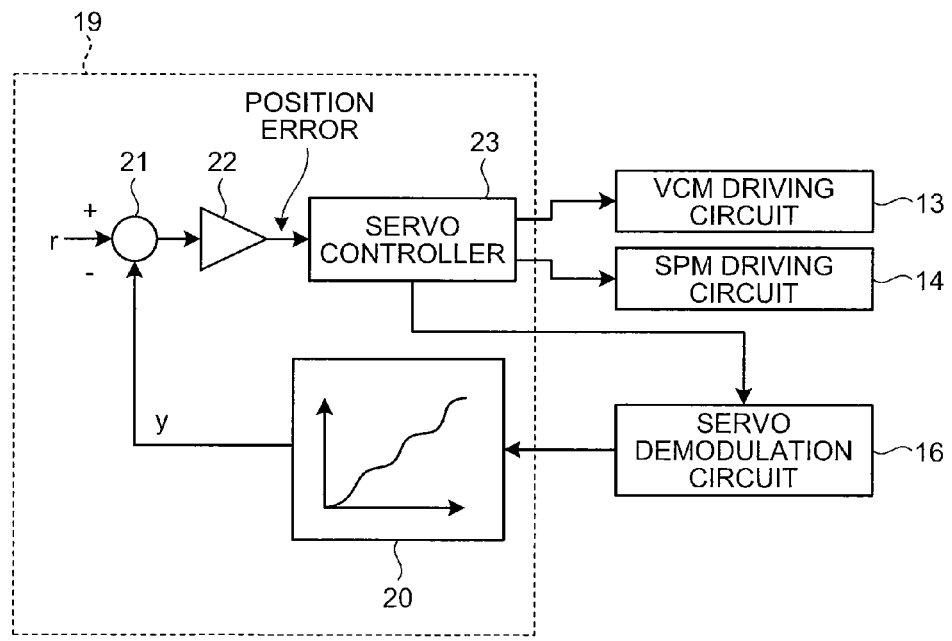
FIG. 12 is an exemplary block diagram of a positioning control system in the embodiment.

A positioning control system executed by the MCU 19 will now be described. FIG. 12 is an exemplary block diagram of the positioning control system.

As illustrated in FIG. 12, the positioning control system comprises the MCU 19, the VCM driving circuit 13, the SPM driving circuit 14, and the servo demodulation circuit 16. The MCU 19 outputs a control signal that controls driving of the VCM driving circuit 13 and the SPM driving circuit 14 based on the position signal supplied from the servo demodulation circuit 16. In addition, the MCU 19 outputs a gate selection signal that selects a gate signal generated in the servo demodulation circuit 16 (which will be described later in detail).

FIG. 13 is an exemplary block diagram of the servo demodulation circuit 16. As illustrated in FIG. 13, the servo demodulation circuit 16 comprises a preamplifier 30, an automatic gain control (AGC) circuit 31, a servo mark detector 32, a gate signal generator 33, a track number detector 34, a PosA detector 35, a PosB detector 36, a PosC detector 37, and a PosD detector 38.

The preamplifier 30 amplifies a read signal supplied from the read channel 15. The AGC circuit 31 adjusts the gain of the read signal, and performs control to keep the amplitude of the read signal constant. The servo mark detector 32 detects a servo mark (refer to FIGS. 3 and 4) from the read signal.

Figure 14:
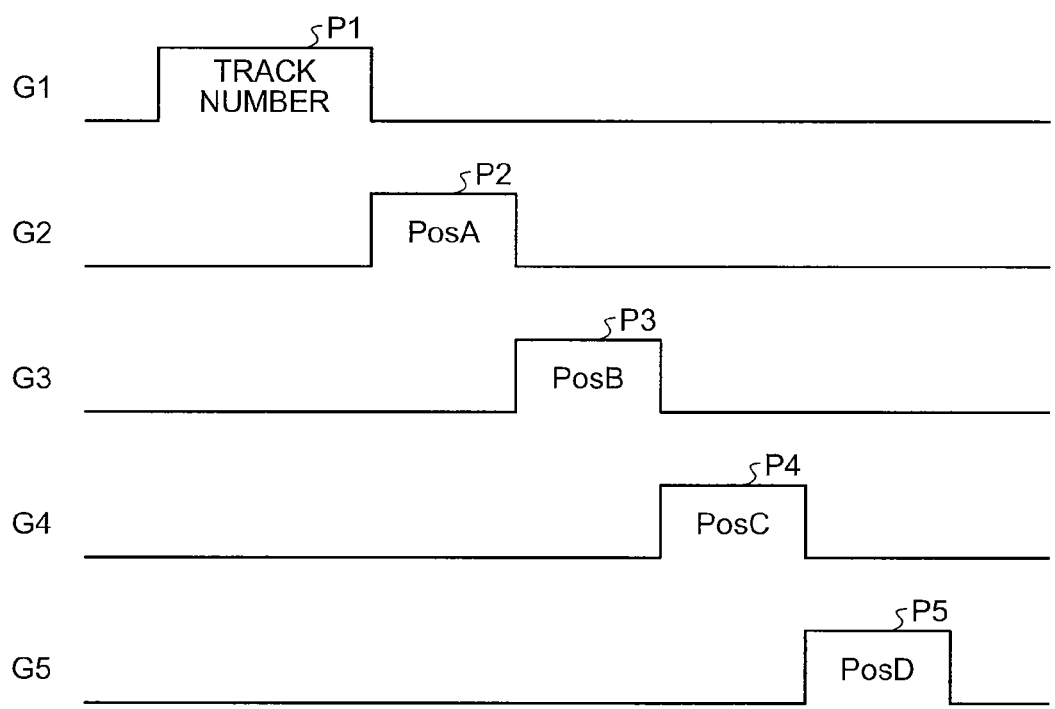
FIG. 14 is an exemplary timing chart of gate signals in the embodiment.

The gate signal generator 33 generates gate signals for the track number detector 34, the PosA detector 35, the PosB detector 36, the PosC detector 37, and the PosD detector 38 at operational timings synchronized with a reference clock to be input in accordance with detection of the servo mark. FIG. 14 is an exemplary timing chart of the gate signals. As illustrated in FIG. 14, in accordance with the detection of the servo mark, the gate signal generator 33 generates a gate signal G1 with a peak P1 synchronized with a timing for reading a track number included in the read signal. Further, in accordance with the detection of the servo mark, the gate signal generator 33 generates a gate signal G2 with a peak P2 synchronized with a timing for reading a position signal PosA included in the read signal. Further, in accordance with the detection of the servo mark, the gate signal timing for reading a position signal PosB included in the read signal in accordance with detection of the servo mark. Further, in accordance with the detection of the servo mark, the gate signal generator 33 generates a gate signal G4 with a peak P4 synchronized with a timing for reading a position signal PosC included in the read signal. Further, in accordance with the detection of the servo mark, the gate signal generator 33 generates a gate signal G5 with a peak P5 synchronized with a timing for reading a position signal PosD included in the read signal.

The track number detector 34 detects (reads) a track number included in the read signal in accordance with the gate signal G1, and outputs the track number. The PosA detector 35 detects (reads) the position signal PosA included in the read signal in accordance with the gate signal G2, and outputs the amplitude thereof as PosA. The PosB detector 36 detects (reads) the position signal PosB included in the read signal in accordance with the gate signal G3, and outputs the amplitude thereof as PosB. The PosC detector 37 detects (reads) the position signal PosC included in the read signal in accordance with the gate signal G4, and outputs the amplitude thereof as PosC. The PosD detector 38 detects (reads) the position signal PosD included in the read signal in accordance with the gate signal G5, and outputs the amplitude thereof as PosD.

The gate signal generator 33 generates the gate signals G2 to G5 with the peaks P2 to P5, respectively, of which timings are different from one another in accordance with an operation mode set in accordance with the gate selection signal output from the MCU 19.

Figure 15:
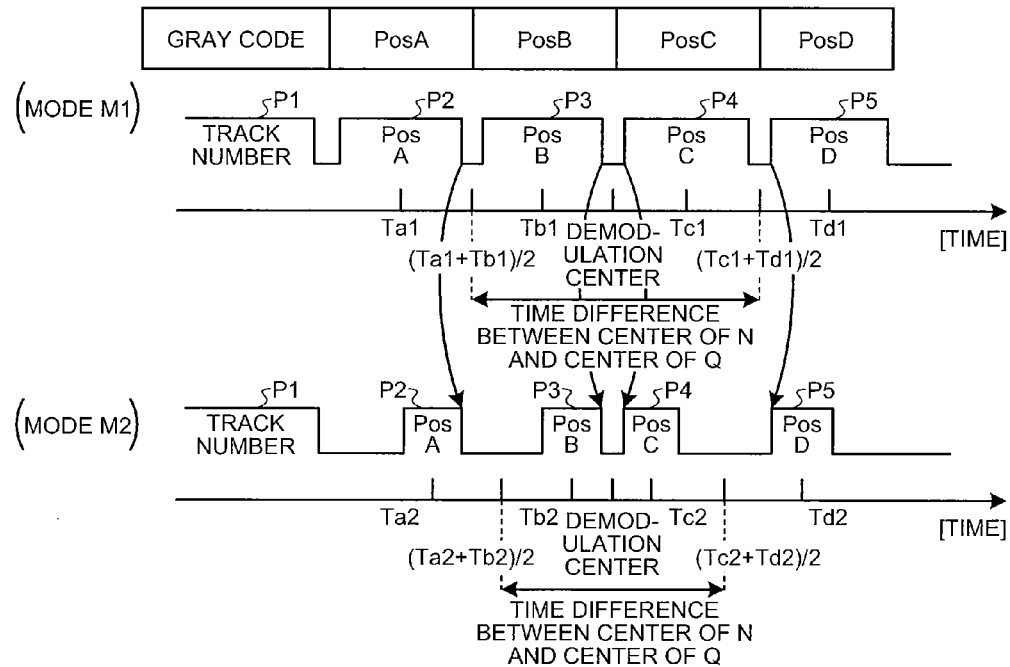
FIG. 15 is an exemplary conceptual diagram for explaining different timings of peaks, in the embodiment.

FIG. 15 is an exemplary conceptual diagram for explaining the timings of the peaks P2 to P5 that are different from each another. As illustrated in FIG. 15, if a mode M1 is set in accordance with the gate selection signal, center time points Ta1, Tb1, Tc1, and Td1 of the peaks P2 to P5 contained in the gate signals G2 to G5 generated by the gate signal generator 33 coincide with the centers of the position signals PosA to PosD of the servo mark, respectively. The periods of the peaks P2 to P5 substantially coincide with the widths of the position signals PosA to PosD of the servo mark, respectively. The timings of the peaks P2 to P5 of when the mode M1 is set are generated with reference to a value written in a register or the like in advance in accordance with the time points estimated as the positions of the position signals PosA to PosD of the servo mark.

If a mode M2 is set in accordance with the gate selection signal, the periods for reading the peaks P2 to P5 included in the gate signals G2 to G5 generated by the gate signal generator 33 are made shorter (widths thereof are made smaller) than that of when the mode M1 is set. Specifically, the periods for reading are made approximately half of those of the mode M1. Furthermore, center time points Ta2, Tb2, Tc2, and Td2 of the peaks P2 to P5 are shifted closer to the center of the position signals PosA to PosD of the servo mark, that is, the time (demodulation center time) corresponding to the center of the burst portion. More specifically, the peaks P2 to P5 of when the mode M2 is set are generated by bringing close one of a rising timing and a falling timing of each of the peaks P2 to P5 of when the mode M1 is set to other one of the rising timing and the falling timing. Here, the other one of the rising timing and the falling timing is closer to the demodulation center time than the one of the rising timing and the falling timing.

Therefore, in the peaks P2 to P5 when the mode M2 is set, the center of PosN estimated as (Ta2+Tb2)/2 and the center of PosQ estimated as (Tc2+Td2)/2 are shifted toward the demodulation center time, compared with the case when the mode M1 is set. Accordingly, the peaks P2 to P5 of when the mode M2 is set, as indicated in the simulation described above, respond to the shifts of PosN and PosQ due to the increase in the velocity of the magnetic head 4 in the radial direction, whereby the error between the real position and the decoded position of the magnetic head 4 is expected to be reduced.

The timings of the peaks P2 to P5 of when the mode M2 is set, in the same manner as those in the mode M1, are generated with reference to a value written in a register or the like in advance in accordance with the time points estimated as the positions of the position signals PosA to PosD with reference to the servo mark.

Figure 16:
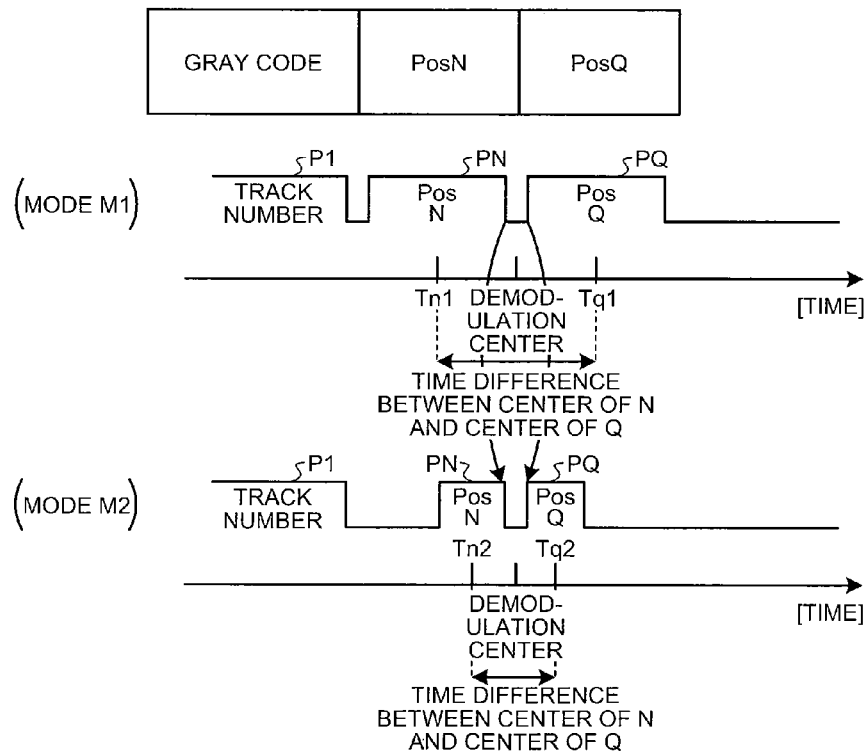
FIG. 16 is an exemplary conceptual diagram illustrating gate signals for a NULL pattern in the embodiment.

Gate signals corresponding to the NULL pattern of two phases will now be described. FIG. 16 is an exemplary conceptual diagram illustrating gate signals in the case of the NULL pattern. As illustrated in FIG. 16, in the same manner as in the case of the four phases described above, gate signals including a peak PN corresponding to reading of the position signal PosN and a peak PQ corresponding to reading of the position signal PosQ are generated for the NULL pattern.

More specifically, if the mode M1 is set in accordance with the gate selection signal, the center time points Tn1 and Tq1 of the peaks PN and PQ coincide with the centers of the position signals PosN and PosQ of the servo mark, respectively. Further, the periods of the peaks PN and PQ substantially coincide with the widths of the position signals PosN and PosQ of the servo mark, respectively. The timings of the peaks PN and PQ of when the mode M1 is set are generated with reference to a value written in a register or the like in advance in accordance with the time points estimated as the positions of the position signals PosN and PosQ based on the servo mark.

If the mode M2 is set in accordance with the gate selection signal, the periods for reading the peaks PN and PQ are made shorter (widths thereof are made smaller) than that of when the mode M1 is set. Specifically, the periods for reading are made approximately half of those of when the mode M1 is set. Furthermore, center time points Tn2 and Tq2 of the peaks PN and PQ are shifted closer to the center of the position signals PosN and PosQ of the servo mark, that is, the time (demodulation center time) corresponding to the center of the burst portion. More specifically, the peaks PN and PQ of when the mode M2 is set are generated by bringing close one of a rising timing and a falling timing of each of the peaks PN and PQ of when the mode M1 is set to other one of the rising timing and the falling timing. Here, the other one of the rising timing and the falling timing is closer to the demodulation center time than the one of the rising timing and the falling timing.

Therefore, in the peaks PN and PQ of when the mode M2 is set, the center of PosN and the center of PosQ are shifted toward the demodulation center time compared with that of when the mode M1 is set. Accordingly, the peaks PN and PQ of when the mode M2 is set, as indicated in the simulation described above, respond to the shifts of PosN and PosQ due to the increase in the velocity of the magnetic head 4 in the radial direction, whereby the error between the real position and the decoded position of the magnetic head 4 is expected to be reduced.

The timings of the peaks PN and PQ of when the mode M2 is set, in the same manner as those in the mode M1, are generated with reference to a value written in a register or the like in advance in accordance with the time points estimated as the positions of the position signals PosN and PosQ with reference to the servo mark.

Referring back to FIG. 12, the MCU 19 comprises a position demodulator 20, an error calculator 21, a gain correction module 22, and a servo controller 23. These modules are realized by dividing the functions of the MCU 19 into blocks. The position demodulator 20 calculates the decoded position (Position) from a track number, PosA, PosB, PosC, and PosD supplied from the servo demodulation circuit 16 in accordance with Equations above. Furthermore, when the virtual circular control is performed under the control by the servo controller 23, the position demodulator 20 supplies a position orbit (virtual circular orbit) so as to ignore the eccentricity of the disk 6, and eliminates the position orbit from PosA, PosB, PosC, and PosD to obtain the decoded position.

Figure 17:
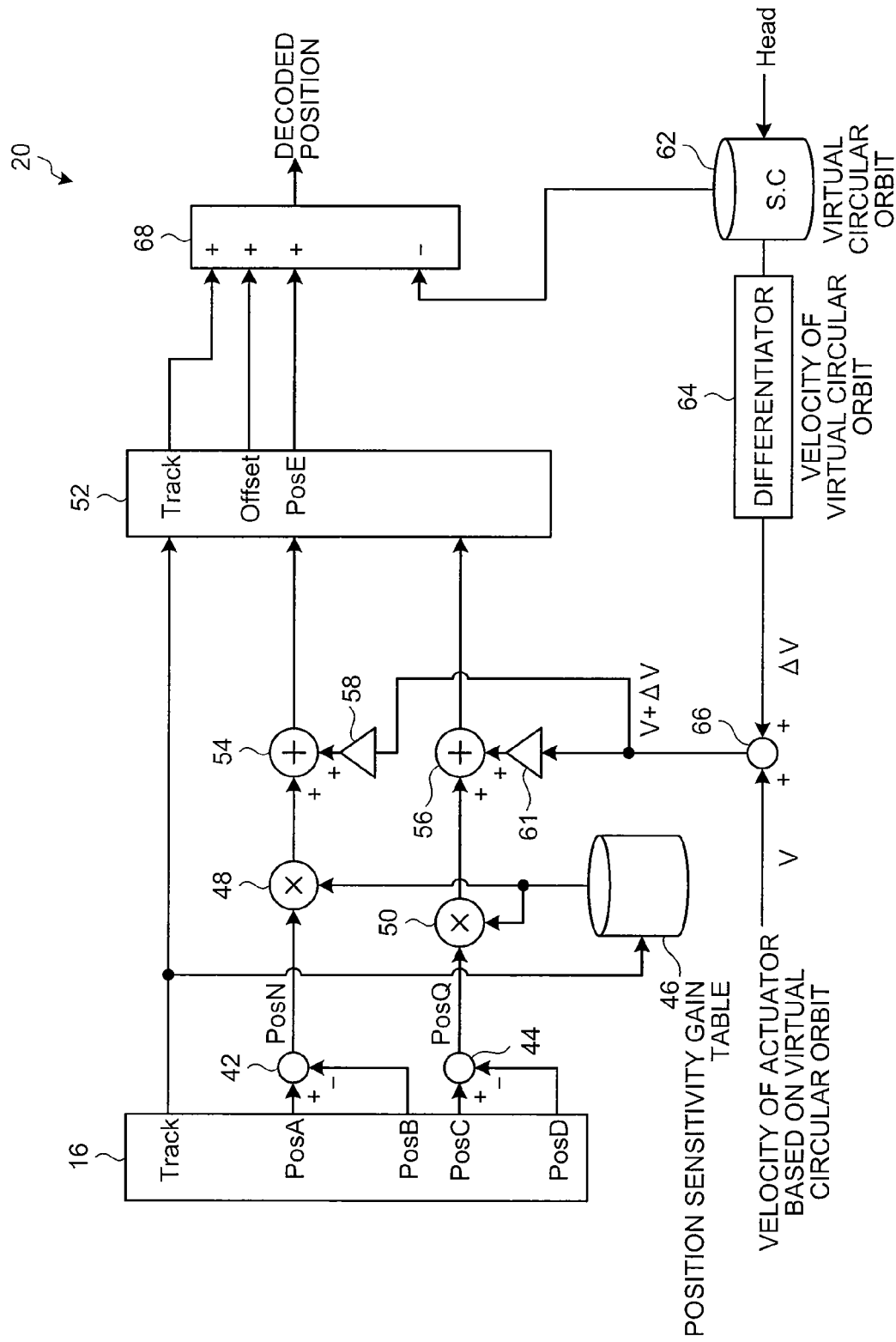
FIG. 17 is an exemplary block diagram of a configuration of a position demodulator in the embodiment.

The configuration of the position demodulator 20 will now be described in detail. FIG. 17 is an exemplary block diagram of the configuration of the position demodulator 20. As illustrated in FIG. 17, calculators 42 and 44 calculate PosN and PosQ by Equations (1) and (2) based on PosA to PosD output from the servo demodulation circuit 16. Multipliers 48 and 50 multiply calculated PosN and PosQ by a position sensitivity gain supplied from a position sensitivity gain table 46.

The position sensitivity gain is a conversion coefficient used for obtaining a position by using PosN and posQ, and changes depending on the track position. The position sensitivity gain table 46 retains the position sensitivity gain for each zone, and the position sensitivity gain of the zone corresponding to the demodulated track position is read therefrom. Note that Japanese Patent Application (KOKAI) No. H8-195044 (published on Jul. 30, 1996), for example, discloses correction of the position sensitivity gain in detail.

Subsequently, correction of a velocity offset is performed. The correction of the velocity offset will be described later. A position selection module 52 selects either one of PosN and PosQ on which the correction of the velocity offset is performed to obtain PosE indicating a position.

Figures 18, 19:
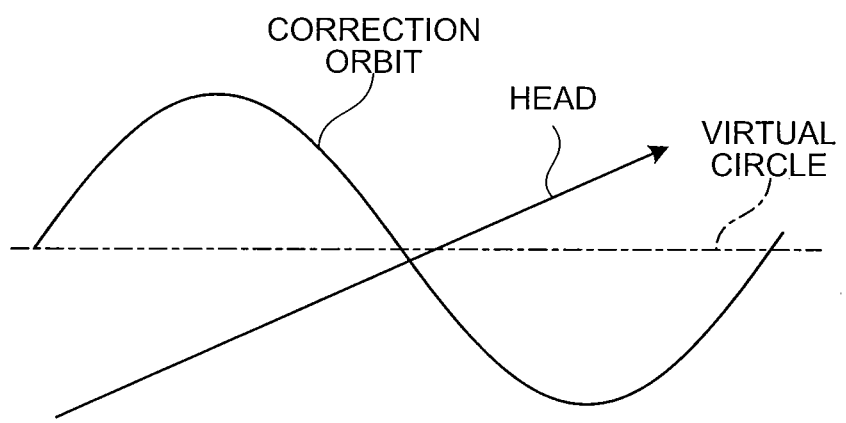
FIG. 18 is an exemplary diagram for explaining velocity offset correction in the embodiment.
FIG. 19 is an exemplary virtual circular orbit table in the embodiment.

A position addition module 68 adds an offset (difference between the positions of the read element and the write element) and PosE indicating the position to the demodulated track number. In the virtual circular control, a virtual circular orbit table 62 is provided. The virtual circular orbit is generated in synchronization with the sectors on the disk 6, and the phase and the amplitude thereof change depending on individual devices and heads. The generation of such a position orbit is expressed by the following Equation:

$$\text{Position Orbit} = S[\text{Head}] \times \sin(\omega t) + C[\text{Head}] \times \cos(\omega t) \quad (6)$$

where $\omega$ represents the angular frequency of rotation of the disk. The values of the coefficients S and C are stored in the virtual circular orbit table 62 for each head. FIG. 19 is an exemplary diagram for explaining the virtual circular orbit table 62. As illustrated in FIG. 19, the virtual circular orbit table 62 is a table storing therein the coefficient S of a sine wave and the coefficient C of a cosine wave for each of the heads 0, 1, . . . n.

The virtual circular orbit table 62 is indexed by the head number Head, and the coefficient S of a sine wave and the coefficient C of a cosine wave corresponding thereto are retrieved to generate a position orbit by Equation of the position orbit. The position addition module 68 subtracts the position orbit from the additional value of the track number, the offset, and PosE indicating the position described above to output the decoded position.

The correction of the velocity offset mentioned earlier will now be described. A velocity V of the actuator is a velocity based on the circular orbit followed by the magnetic head 4. Therefore, if the magnetic head 4 does not follow the circular orbit 600 of the rotating disk 6 and is positioned on the virtual circular orbit, an error $\Delta V$ of a relative velocity occurs between the virtual circular orbit on which the magnetic head 4 is positioned and the circular orbit 600 of the disk 6.

As illustrated in FIG. 18, because a correction orbit for positioning the magnetic head 4 on the virtual circular orbit is represented by a sine wave (sine), the relative velocity becomes a cosine wave (cosine), which can be calculated easily. Practically, as described above, the virtual circular orbit is generated in synchronization with the sectors on the disk 6, and the phase and the amplitude thereof change depending on individual devices and heads. The generation of such a position orbit is expressed by the following Equation:

$$\text{Position Orbit} = S[\text{Head}] \times \sin(\omega t) + C[\text{Head}] \times \cos(\omega t)$$

where $\omega$ represents an angular frequency of the rotation of the disk. The values of the coefficient S of a sine wave and the coefficient C of a cosine wave are stored in the virtual circular orbit table 62 for each of the heads. A table storing therein the values of the coefficients S and C may be provided in each location in the radial direction of the disk in some cases.

At this time, the velocity (relative velocity) of the virtual circular orbit is obtained by differentiating the position orbit. In other words, the velocity is expressed by:

$$\text{Velocity of Orbit} = \{S[\text{Head}] \times \cos(\omega t) - C[\text{Head}] \times \sin(\omega t)\}/\omega \quad (7)$$

Therefore, a differentiator 64 that differentiates the position orbit calculates the velocity of the orbit from the position orbit. Because the position orbit changes depending on samples, the velocity also changes depending on the samples. Therefore, the velocity offsets of PosN and PosQ in association with the velocity also change depending on the samples. Even if the magnetic head 4 can be positioned on the virtual circular orbit with an error "0", it is necessary to keep calculating and adding the velocity offset for each of the samples.

While a seek operation is being performed, further velocity is generated in the actuator. The velocity V is constantly calculated during seek control, such that the current velocity and the velocity in the next sample are always recognized. Therefore, the velocity V in association with the seek control and the error $\Delta V$ caused by the orbit described above are added by an adder 66 to be used for the correction of the velocity offsets of PosN and PosQ.

To correct the velocity offsets of PosN and PosQ, adders 54 and 56 add values of the velocity offsets to PosN and PosQ. The values of the velocity offsets are obtained by Equation below. Coefficients by which the velocity is multiplied can be obtained uniquely from specifications (from bit 0 of Gray code to the boundary between PosA and PosB, and from bit 0 of Gray code to the boundary between PosC and PosD) of the servo patterns illustrated in FIGS. 3 and 4, and are set as the gain of amplifiers 58 and 61, respectively.

$$\text{Pos}N \text{ Offset} = \text{Velocity} \times (\text{Time From Gray Code Bit } \mathbf{0} \text{ To Boundary Between Pos}A \text{ And Pos}B)/\text{Sample Period} \quad (8)$$

$$\text{Pos}Q \text{ Offset} = \text{Velocity} \times (\text{Time From Gray Code Bit } \mathbf{0} \text{ To Boundary Between Pos}C \text{ And Pos}D)/\text{Sample Period} \quad (9)$$

In other words, the coefficients are determined by the time from bit 0 of Gray code (track number) to the boundary between PosA and PosB, and the time from bit 0 of Gray code to the boundary between PosC and PosD illustrated in FIGS. 3 and 4.

Accordingly, in the virtual circular control, because the relative velocity can be calculated from the known sine-wave position orbit (position is Sin, and velocity is Cos), the offsets of PosN and PosQ during tracking can be obtained uniquely.

As illustrated in FIG. 17, two orbits of the position orbit and the velocity orbit are obtained from outputs from the virtual circular orbit table 62 of the virtual circular orbit. The error $\Delta V$ among them and the relative velocity V from the virtual circular orbit of the actuator are added to be input when the decoded positions of PosN and PosQ are calculated. The input (error $\Delta V$+relative velocity V) is compounded with PosN and PosQ in the adders 54 and 56, respectively, to be calculated as the decoded positions.

Referring back to FIG. 12, the error calculator 21 comprises: a first calculator that subtracts a target position r from a decoded position y and outputs a position error; and a second calculator that subtracts a target position from a track position and outputs a position error (neither of which is illustrated). The gain correction module 22 compares the actual velocity with the limiting velocity specified in advance to determine the velocity. In addition, the gain correction module 22 selects the position error to be output to the servo controller 23 from the position error calculated by the first calculator and the position error calculated by the second calculator, and outputs the selected position error to the servo controller 23.

Figure 20:
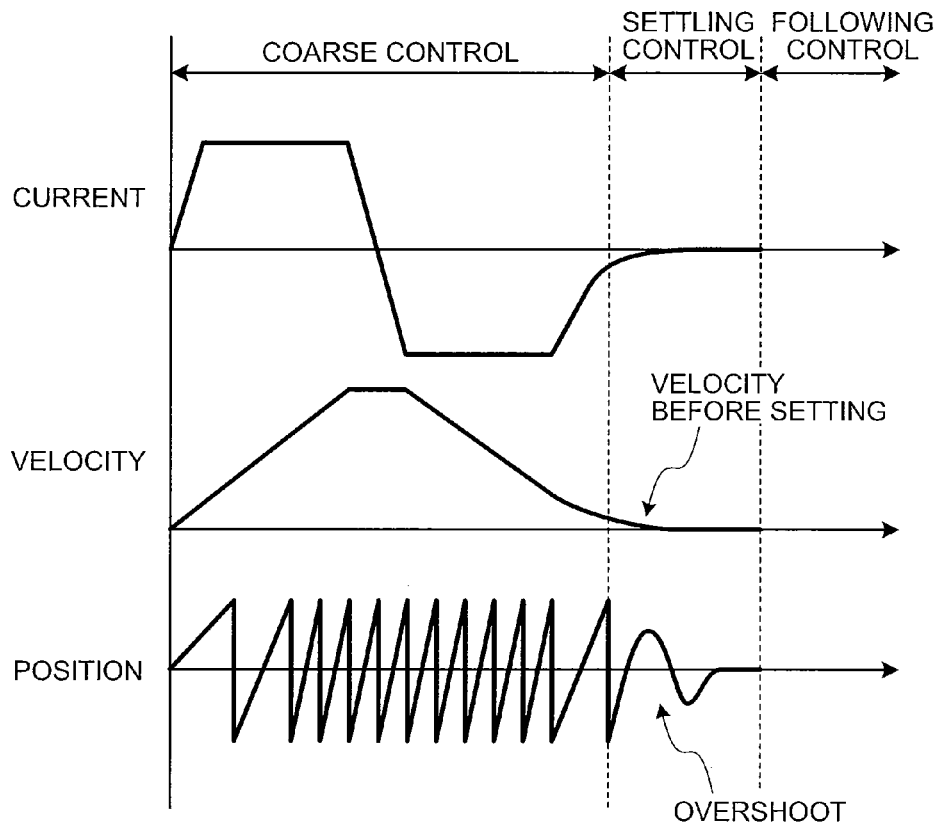
FIG. 20 is an exemplary diagram for explaining an operation of a servo controller in the embodiment.

The servo controller 23 is a known servo controller that calculates the control amount in accordance with the position error. In addition, the servo controller 23 performs coarse control, settling control, and following control in accordance with the position error. FIG. 20 is an exemplary view for explaining an operation of the servo controller 23.

As illustrated in FIG. 20, the coarse control is velocity control to the target position. The coarse control comprises velocity control, proportional-derivative (PD) control, or observer control that does not include steady-state bias estimation. In addition, the coarse control switches control modes between acceleration, constant velocity, and deceleration. The acceleration mode provides such control that current is applied to increase the velocity. The constant-velocity mode provides such control that the current is set to "0" to keep the velocity constant. The deceleration mode provides such control that the current is applied in a direction opposite to that in the acceleration mode to make the velocity approximately zero in the vicinity of the target position. If the distance is small, the constant-velocity mode is not performed.

The following control is control for causing the magnetic head to follow the target position. The following control comprises proportional-integral-derivative (PID) control, PI×LeadLag, or observer control that includes steady-state bias estimation. The settling control is a control mode for connecting the coarse control and the following control. In the settling control, the control system includes an integral element.

The servo controller 23 calculates the control amount for the virtual circular control described above in response to a command received from the HDC 18. More specifically, the servo controller 23 causes the magnetic head 4 not to follow the eccentricity of the disk 6 (stops driving of the actuator), such that the trajectory 400 of the magnetic head 4 coincides with the perfect circle (virtual circle) centering on the axis center 401 of the SPM 5. In addition, the servo controller 23 outputs the gate selection signal depending on whether the virtual circular control is performed.

Figure 21:
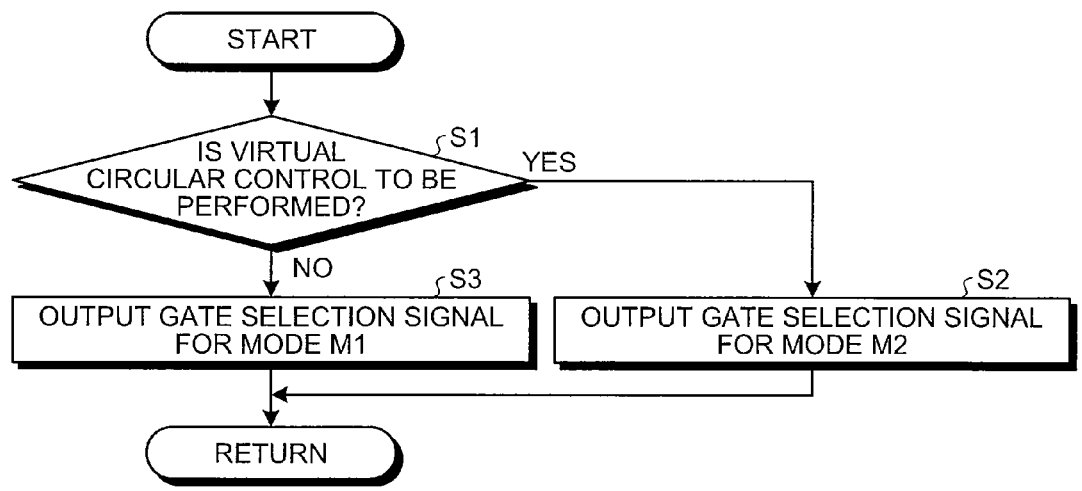
FIG. 21 is an exemplary flowchart of an operation relating to an output of a gate selection signal in the embodiment.

FIG. 21 is an exemplary flowchart illustrating an example of an operation relating to an output of the gate selection signal. As illustrated in FIG. 21, the servo controller 23 determines whether the virtual circular control is to be performed based on a command received from the HDC 18 (S1). If the virtual circular control is performed (Yes at S1), the servo controller 23 outputs the gate selection signal for setting the mode M2 to the servo demodulation circuit 16 (S2). If the virtual circular operation is not performed (No at S1), the servo controller 23 outputs the gate selection signal for setting the mode M1 to the servo demodulation circuit 16 (S3). Therefore, in the disk storage device 100, when the virtual circular control is performed, the gate signal in accordance with the setting of the mode M2 is generated, and thus the position signals are read from the servo mark.

To examine the relationship between a real position of the magnetic head 4 and a decoded position thereof, the case where the virtual circular control is performed is simulated by using the disk storage device 100 according to the embodiment as a model. The simulation is performed in a case of an area pattern, for example, in which the position signals PosA, PosB, PosC, and PosD of four phases are obtained from the burst portion to obtain the decoded position.

Figure 22A:
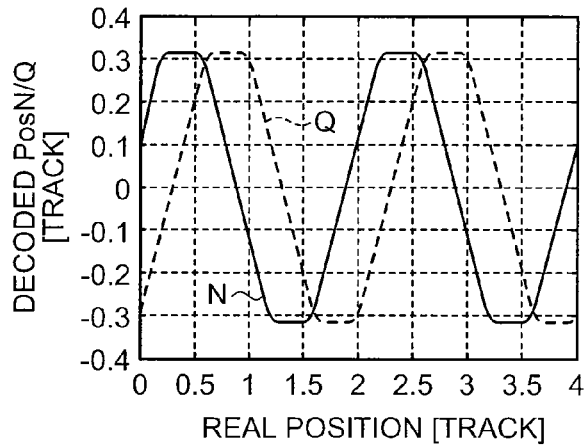
FIG. 22A is an exemplary graph of PosN and PosQ with respect to a real position of the magnetic head in a simulation result of the disk storage device in the embodiment.
Figure 22B:
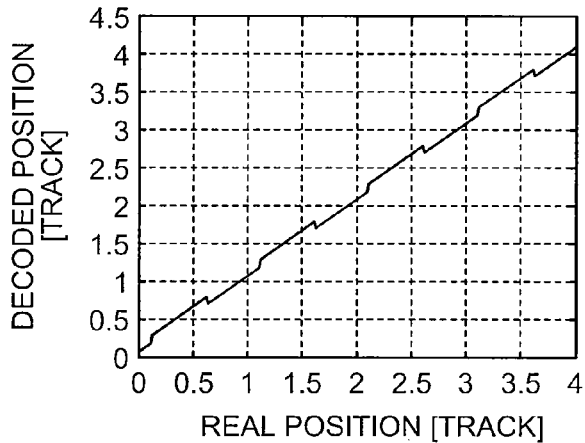
FIG. 22B is an exemplary graph of the real position and a decoded position of the magnetic head in the simulation result of the disk storage device in the embodiment.
Figure 22C:
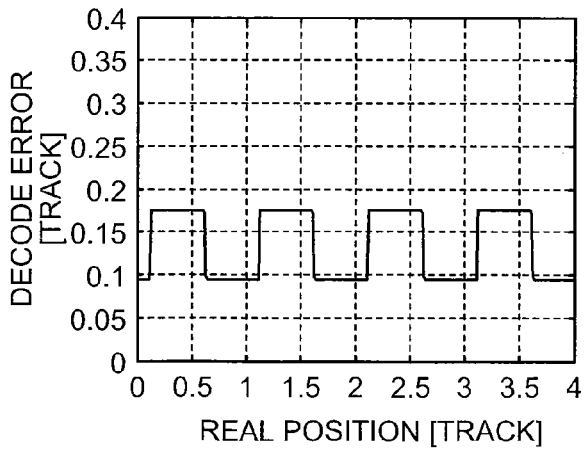
FIG. 22C is an exemplary graph illustrating a position error caused by a relative velocity in the simulation result of the disk storage device in the embodiment.

FIG. 22A is an exemplary graph of PosN and PosQ with respect to a real position of the magnetic head 4 in a simulation result of the disk storage device 100 according to the embodiment. FIG. 22B is an exemplary graph of the real position and a decoded position of the magnetic head 4 in the simulation result of the disk storage device 100 according to the embodiment. FIG. 22C is an exemplary graph illustrating a position error caused by a relative velocity in the simulation result of the disk storage device 100 according to the embodiment.

FIGS. 22A, 22B, and 22C illustrate the simulation result of when the virtual circular control is performed by rotating the disk 6 with an eccentricity of 50 μm at 7200 rpm. In the simulation, the maximum relative velocity between the magnetic head 4 and the disk 6 is 10.5 tracks/sample. In other words, the simulation is performed under the same conditions as in the case illustrated in FIGS. 6A, 6B, and 6C.

As illustrated in FIGS. 22A, 22B, and 22C, in the disk storage device 100 according to the embodiment, the error between the real position and the decoded position of the magnetic head 4 corresponds to 0.08 tracks (difference between the peaks and the troughs in the waveform). In other words, compared with the conventional case, the error is reduced by approximately 12.5%.

Figure 23A:
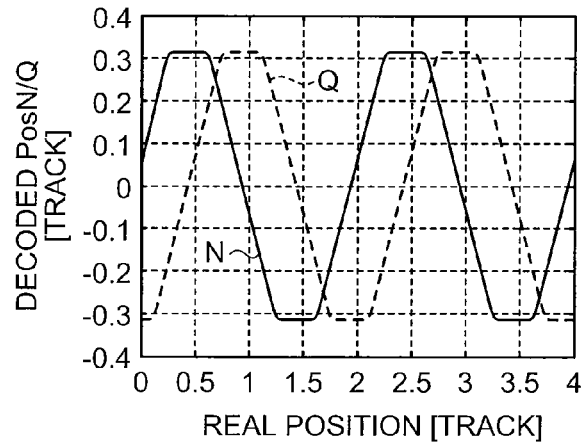
FIG. 23A is an exemplary graph of PosN and PosQ with respect to a real position of the magnetic head in a simulation result of the disk storage device in the embodiment.
Figure 23B:
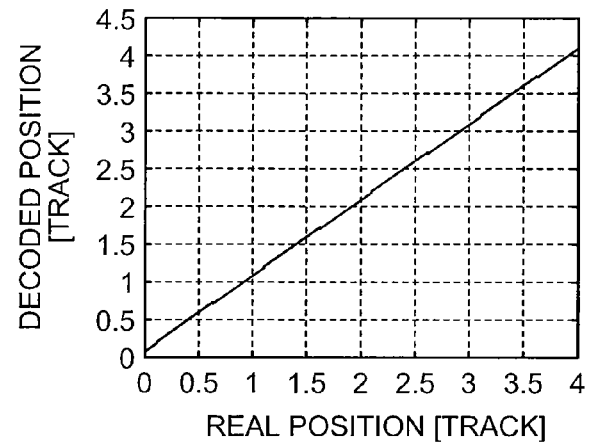
FIG. 23B is an exemplary graph of the real position and a decoded position of the magnetic head in the simulation result of the disk storage device in the embodiment.
Figure 23C:
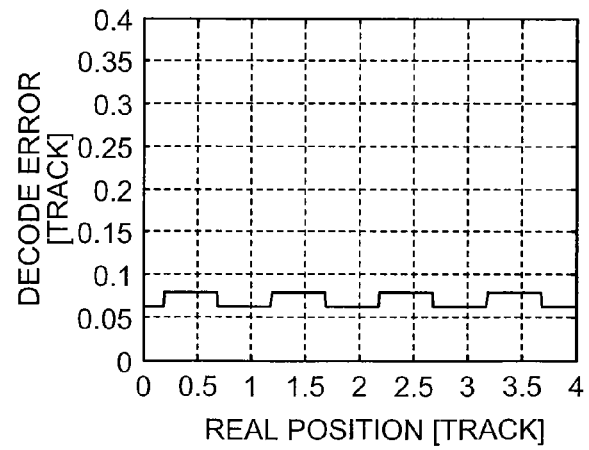
FIG. 23C is an exemplary graph illustrating a position error caused by a relative velocity in the simulation result of the disk storage device in the embodiment.

Similarly, a simulation result of the disk storage device 100 according to the embodiment is illustrated in a case of the NULL pattern, for example, in which the position signals PosN and PosQ of two phases are obtained from the burst portion to obtain the decoded position. FIG. 23A is an exemplary graph of PosN and PosQ with respect to a real position of the magnetic head 4 in the simulation result of the disk storage device 100 according to the embodiment. FIG. 23B is an exemplary graph of the real position and a decoded position of the magnetic head 4 in the simulation result of the disk storage device 100 according to the embodiment. FIG. 23C is an exemplary graph illustrating a position error caused by a relative velocity in the simulation result of the disk storage device 100 according to the embodiment.

FIGS. 23A, 23B, and 23C illustrate the simulation result of when the virtual circular control is performed by rotating the disk 6 with an eccentricity of 50 μm at 7200 rpm. In the simulation, the maximum relative velocity between the magnetic head 4 and the disk 6 is 10.5 tracks/sample. In other words, the simulation is performed under the same conditions as in the case illustrated in FIGS. 8A, 8B, and 8C.

As illustrated in FIGS. 23A, 23B, and 23C, in the disk storage device 100 according to the embodiment, the error between the real position and the decoded position of the magnetic head 4 corresponds to 0.02 tracks (difference between the peaks and the troughs in the waveform). In other words, compared with the conventional case, the error is reduced by approximately 20%.

In the virtual circular control, the relative velocity changes in a sine-wave form in one track. In other words, the relative velocity is not constant in one track. When the virtual circular control is performed, a relative offset of an intermediate value between the maximum and the minimum is present averagely. Because the relative offset also changes in a sine-wave form, the offset is corrected by eccentricity correction, whereby the offset is eliminated apparently. Therefore, the deviation from the intermediate value between the maximum value and the minimum value, that is, a half value of the difference between the maximum value and the minimum value can be regarded as the position error occurring when the control is performed practically.

From this point of view, in the disk storage device 100 according to the embodiment, the position error is expected to be reduced by approximately 38% compared with the case of a conventional area pattern. Furthermore, in the case of the NULL pattern, the position error is expected to be reduced by approximately 73%. As described above, in the disk storage device 100 according to the embodiment, the error of the decoded position occurring when the virtual circular control is performed can be reduced. Therefore, it is possible to improve the response performance when the seek operation is started during the virtual circular control, for example.

Figure 24:
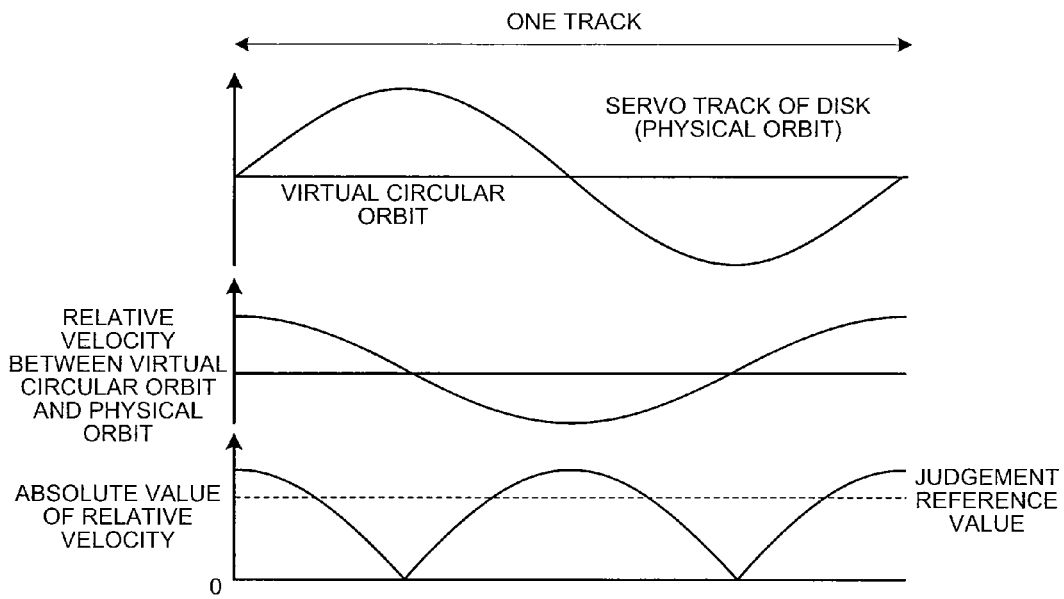
FIG. 24 is an exemplary graph illustrating a relationship among a virtual circular orbit, a physical orbit, and the relative velocity in the embodiment.

A description will be made of the case in which the gate signals generated by the gate signal generator 33 are switched in accordance with the moving velocity of the magnetic head 4 in the radial direction, and the relative velocity between the magnetic head 4 and the disk 6. FIG. 24 is an exemplary graph illustrating a relationship between a virtual circular orbit, a physical orbit, and the relative velocity.

As illustrated in FIG. 24, the servo track (physical orbit) of the disk 6 and the virtual circular orbit have a relationship of a sine waveform in which one track of the disk 6 is one cycle because of the eccentricity of the disk 6. Therefore, the relative velocity between the magnetic head 4 following the virtual circular orbit, and the physical orbit indicates a cosine waveform. As is clear from the waveform, the relative velocity has a low-velocity period in which the error of the decoded position can be estimated to be sufficiently small. The period is calculated by comparing the absolute value of the relative velocity and a predetermined determination reference value. In the low-velocity period, switching of the gate signals is performed such that a gate signal in accordance with the setting of the mode M1 is generated. With this switching, the read period of the position signal is made long to improve the noise resistance performance when the error of the decoded position can be estimated to be sufficiently small.

Figure 25:
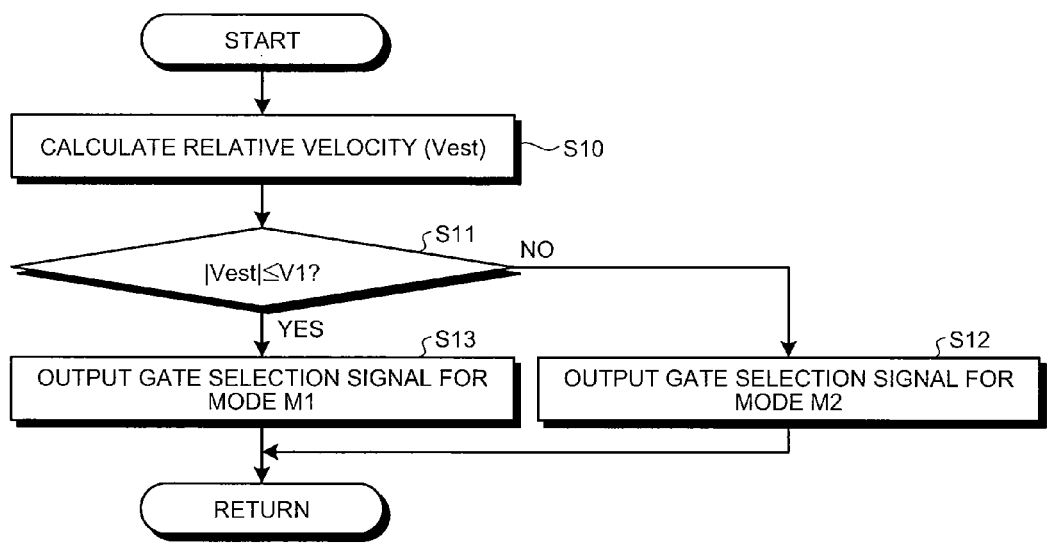
FIG. 25 is an exemplary flowchart of an operation relating to switching of the gate signals in accordance with the relative velocity in the embodiment.

FIG. 25 is an exemplary flowchart illustrating an example of an operation relating to the switching of the gate signals in accordance with the relative velocity. As illustrated in FIG. 25, when the process is started, the servo controller 23 serving as a calculation module calculates the moving velocity of the magnetic head 4 in the radial direction and the relative velocity (Vest) between the magnetic head 4 and the disk 6 (S10). Specifically, when the virtual circular control is performed, because the differential value of the decoded position corresponds to the relative velocity, the servo controller 23 stacks the decoded position calculated by the position demodulator 20 in accordance with read of the servo mark as a sample, and compares (differentiates) the sample with the next sample to calculate the relative velocity.

Subsequently, the servo controller 23 determines whether the absolute value of Vest is less than or equal to a predetermined reference velocity (V1), that is, whether the magnitude of the relative velocity is less than or equal to that of the reference velocity (V1) (S11). If the magnitude of the relative velocity is equal to or smaller than that of the reference velocity (V1) (Yes at S11), the servo controller 23 outputs the gate selection signal for setting the mode M1 to the servo demodulation circuit 16 (S13).

If the magnitude of the relative velocity is larger than that of the reference velocity (V1) (No at S11), the servo controller 23 outputs the gate selection signal for setting the mode M2 to the servo demodulation circuit 16 (S12). Therefore, in the servo demodulation circuit 16, if the relative velocity is higher than the reference velocity (V1), the gate signal in accordance with the setting of the mode M2 is generated, whereas if the relative velocity is equal to or lower than the reference velocity (V1), the gate signal in accordance with the setting of the mode M1 is generated.

The case in which the gate signals are switched for each magnetic head 4 will now be described. As illustrated in FIG. 11, when read and write operations are performed on the disks 6 by a plurality of magnetic heads 4, even if the same virtual circular control is performed, the magnetic heads 4 have amplitudes of the virtual circular orbits different from one another because of errors in manufacturing or the like. In other words, the magnetic heads 4 have magnitudes of the relative velocity different from one another depending on the variations of the amplitudes of the virtual circular orbits, and have magnitudes of the errors of the decoded positions different from one another as well. Therefore, when the virtual circular control is performed, the magnetic head 4 in which the error of the decoded position is large is caused to generate the gate signal in accordance with the setting of the mode M2, whereas the magnetic head 4 in which the error of the decoded position is small is caused to generate the gate signal in accordance with the setting of the mode M1. Switching the gate signals for each of the magnetic heads 4 allows the position signal included in the servo pattern to be read appropriately in this manner.

Figure 26:
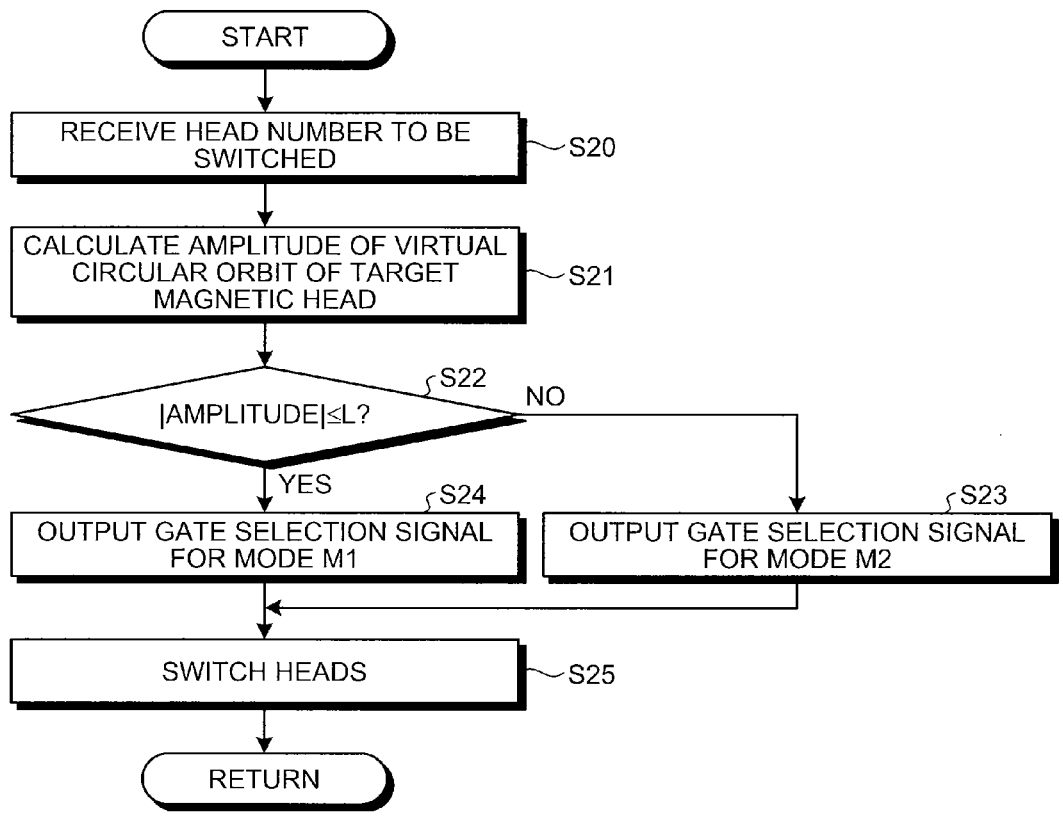
FIG. 26 is an exemplary flowchart of an operation for switching the gate signals for each magnetic head in the embodiment.

FIG. 26 is an exemplary flowchart illustrating an example of an operation for switching the gate signals for each magnetic head 4. As illustrated in FIG. 26, when the process is started, the servo controller 23 acquires the head number to be switched based on a command received from the HDC 18 (S20).

Subsequently, the servo controller 23 calculates the amplitude of the virtual circular orbit of the target magnetic head 4 corresponding to the acquired head number (S21). The amplitude may be obtained by reading the ROM or the storage area on the disk in which the amplitude for each head number is specified in factory shipment or the like, or from the magnitude of the decoded position obtained when the target magnetic head 4 is rotated for several times under the virtual circular control, for example.

Subsequently, the servo controller 23 determines whether the amplitude thus obtained is less than or equal to a predetermined threshold level (L) (S22). If the amplitude is less than or equal to the threshold level (L) (Yes at S22), the servo controller 23 outputs the gate selection signal for setting the mode M1 to the servo demodulation circuit 16 (S24). If the amplitude is larger than the threshold level (L) (No at S22), the servo controller 23 outputs the gate selection signal for setting the mode M2 to the servo demodulation circuit 16 (S23). Subsequently to S23 and S24, the HDC 18 switches the heads (S25).

Figure 27:
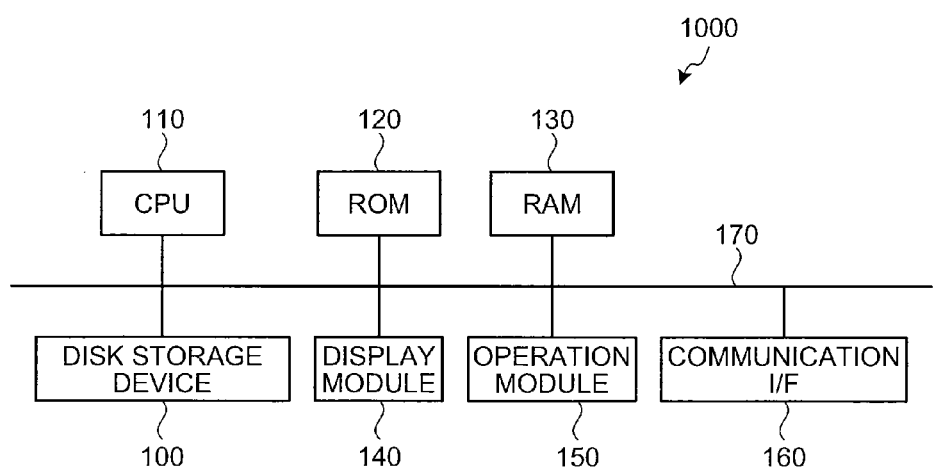
FIG. 27 is an exemplary block diagram of an electronic device comprising the disk storage device in the embodiment.

The electronic device comprising the disk storage device 100 according to the embodiment will now be described. FIG. 27 is an exemplary block diagram illustrating an electronic device 1000 comprising the disk storage device 100 according to the embodiment.

As illustrated in FIG. 27, the electronic device 1000 comprises the disk storage device 100, a central processing unit (CPU) 110, a read only memory (ROM) 120, a random access memory (RAM) 130, a display module 140 such as a liquid crystal display (LCD), an operation module 150 such as a keyboard and a pointing device, and a communication interface (I/F) 160 for connecting the electronic device 1000 to the Internet or the like. These modules including the disk storage device 100 are connected via a bus 170, and operate under the control performed by the CPU 110. Specific examples of the electronic device 1000 include a personal computer (PC), a notebook PC, a hard disk drive (HDD) recorder, and a television receiving apparatus having an HDD built-in.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk storage device, comprising:
a disk on which a servo pattern is recorded, the servo pattern comprising, for each track, a recording area, a plurality of position signals for detecting an offset position from a center of the respective track being recorded in the recording area;
a head configured to read data recorded on the disk as the disk is being rotated;
a driver configured to drive the head in a radial direction of the disk;
a signal generator configured to generate a first timing signal indicating a timing for reading the position signals from the read data;
a demodulator configured to demodulate a position of the head based on the position signals read in accordance with the generated first timing signal; and
a controller configured to control the driver based on the demodulated position of the head, wherein,
when the controller performs positional control along a virtual circular orbit of the disk, the signal generator is configured to generate a second timing signal, a period of the second timing signal for reading the position signals being shorter than that of the first timing signal, a center time of the period of the second timing signal being shifted closer than that of the first timing signal to a demodulation center time corresponding to a center of the recording area, and wherein,
the second timing signal is obtained by bringing close one of a rising timing and a falling timing of the first timing signal to other one of the rising timing and the falling timing for each of the position signals, the other one of the rising timing and the falling timing being closer than the one of the rising timing and the falling timing to the demodulation center time.

2. The disk storage device of claim 1, further comprising:
a calculator configured to calculate a relative velocity between the head and the disk, wherein
the signal generator is configured to generate the second timing signal when the calculated relative velocity is greater than a preset reference velocity, and to generate the first timing signal when the relative velocity is less than or equal to the reference velocity.

3. The disk storage device of claim 2, wherein the calculator is configured to calculate the relative velocity every time the position of the head is demodulated.

4. The disk storage device of claim 2, wherein the position signals recorded in the recording area represent a four phase pattern.

5. The disk storage device of claim 2, wherein the position signals recorded in the recording area represent a two phase pattern.

6. The disk storage device of claim 2, wherein the disk storage device is an electronic device.

7. The disk storage device of claim 1, further comprising a receiver, wherein
the head comprises a plurality of heads,
the receiver is configured to receive an amplitude of the virtual circular orbit for each of the heads, and
the signal generator is configured to generate the second timing signal when the amplitude of the virtual circular orbit of the each of the heads for reading is greater than a preset threshold value, and to generate the first timing signal when the amplitude is less than or equal to the threshold value.

8. The disk storage device of claim 1, wherein the position signals recorded in the recording area represent a four phase pattern.

9. The disk storage device of claim 1, wherein the position signals recorded in the recording area represent a two phase pattern.

10. A controller of a disk storage device, comprising a disk on which a servo pattern is recorded, a head, and a driver, the servo pattern comprising, for each track, a recording area, a plurality of position signals for detecting an offset position from a center of the respective track being recorded in the recording area, the head being configured to read data recorded on the disk as the disk is being rotated, the driver being configured to drive the head in a radial direction of the disk, the controller comprising:
a signal generator configured to generate a first timing signal indicating a timing for reading the position signals from the read data;
a demodulator configured to demodulate a position of the head based on the position signals read in accordance with the generated first timing signal; and
a controller configured to control the driver based on the demodulated position of the head, wherein,
when the controller performs positional control along a virtual circular orbit of the disk, the signal generator is configured to generate a second timing signal, a period of the second timing signal for reading the position signals being shorter than that of the first timing signal, a center time of the period of the second timing signal being shifted closer than that of the first timing signal to a demodulation center time corresponding to a center of the recording area, and wherein,
the second timing signal is obtained by bringing close one of a rising timing and a falling timing of the first timing signal to other one of the rising timing and the falling timing for each of the position signals, the other one of the rising timing and the falling timing being closer than the one of the rising and the falling timing to the demodulation center time.

11. The controller of claim 10, further comprising:
a calculator configured to calculate a relative velocity between the head and the disk, wherein
the signal generator is configured to generate the second timing signal when the calculated relative velocity is greater than a preset reference velocity, and to generate the first timing signal when the relative velocity is less than or equal to the reference velocity.

12. The controller of claim 10, further comprising a receiver, wherein
the head comprises a plurality of heads,
the receiver is configured to receive an amplitude of the virtual circular orbit for each of the heads, and
the signal generator is configured to generate the second timing signal when the amplitude of the virtual circular orbit of the each of the heads for reading is greater than a preset threshold value, and to generate the first timing signal when the amplitude is less than or equal to the threshold value.

13. The controller of claim 10, wherein the position signals recorded in the recording area represent a four phase pattern.

14. The controller of claim 10, wherein the position signals recorded in the recording area represent a two phase pattern.

15. A controlling method of a disk storage device, comprising a disk on which a servo pattern is recorded, a head, and a driver, the servo pattern comprising, for each track, a recording area, a plurality of position signals for detecting an offset position from a center of the respective track being recorded in the recording area, the head being configured to read data recorded on the disk as the disk is being rotated, the driver being configured to drive the head in a radial direction of the disk, the controlling method comprising:
  generating a first timing signal indicating a timing for reading the position signals from the read data;
  demodulating a position of the head based on the position signals read in accordance with the generated first timing signal; and
  controlling the driver based on the demodulated position of the head, wherein,
  when the controlling performs positional control along a virtual circular orbit of the disk, the generating generates a second timing signal, a period of the second timing signal for reading the position signals being shorter than that of the first timing signal, a center time of the period of the second timing signal being shifted closer than that of the first timing signal to a demodulation center time corresponding to a center of the recording area, and wherein,
  the second timing signal is obtained by bringing close one of a rising timing and a falling timing of the first timing signal to other one of the rising timing and the falling timing for each of the position signals, the other one of the rising timing and the falling timing being closer than the one of the rising timing and the falling timing to the demodulation center time.

16. The controlling method of claim 15, further comprising:
  calculating a relative velocity between the head and the disk, wherein
  the generating comprises generating the second timing signal when the calculated relative velocity is greater than a preset reference velocity, and generating the first timing signal when the relative velocity is less than or equal to the reference velocity.

17. The controlling method of claim 15, wherein,
  the head comprises a plurality of heads,
  the receiving comprises receiving an amplitude of the virtual circular orbit for each of the heads, and
  the generating comprises generating the second timing signal when the amplitude of the virtual circular orbit of the each of the heads for reading is greater than a preset threshold value, and generating the first timing signal when the amplitude is less than or equal to the threshold value.

18. The controlling method of claim 15, wherein the position signals recorded in the recording area represent a four phase pattern.

19. The controlling method of claim 15, wherein the position signals recorded in the recording area represent a two phase pattern.

* * * * *